(12) United States Patent
Ishiguro et al.

(10) Patent No.: US 10,752,200 B2
(45) Date of Patent: Aug. 25, 2020

(54) AIRBAG APPARATUS

(71) Applicant: TOYODA GOSEI CO., LTD., Kiyosu-shi, Aichi-ken (JP)

(72) Inventors: Naohiko Ishiguro, Kiyosu (JP); Ryotaro Ishida, Kiyosu (JP); Hiroyuki Nakanishi, Kiyosu (JP); Wataru Miuta, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 42 days.

(21) Appl. No.: 16/012,211

(22) Filed: Jun. 19, 2018

(65) Prior Publication Data

US 2018/0370479 A1 Dec. 27, 2018

(30) Foreign Application Priority Data

Jun. 27, 2017 (JP) .................... 2017-125279

(51) Int. Cl.
*B60R 21/233* (2006.01)
*B60R 21/2338* (2011.01)
(Continued)

(52) U.S. Cl.
CPC .......... *B60R 21/233* (2013.01); *B60R 21/203* (2013.01); *B60R 21/2334* (2013.01);
(Continued)

(58) Field of Classification Search
CPC . B60R 21/233; B60R 21/2338; B60R 21/203; B60R 21/2334; B60R 21/231;
(Continued)

(56) References Cited

U.S. PATENT DOCUMENTS 5,529,337 A * 6/1996 Takeda .................. B60R 21/233
280/729
6,419,262 B1 * 7/2002 Fendt .................... B60R 21/231
280/729
(Continued)

FOREIGN PATENT DOCUMENTS

JP 2006-508862 A 3/2006
JP 4946984 B2 6/2012

OTHER PUBLICATIONS

Office Action dated May 28, 2020 issued in the corresponding JP patent application No. 2017-125279 (with English translation).

*Primary Examiner* — Keith J Frisby
(74) *Attorney, Agent, or Firm* — Posz Law Group, PLC

(57) ABSTRACT

An airbag has a main bag portion that is provided with an occupant protective surface which is disposed to face the occupant and an auxiliary bag portion that can be disposed on the left side of the storage part, between the main bag portion and a vehicle body-side member, when the inflation is completed. The auxiliary bag portion is configured to enable an inflating gas to flow into an inside thereof through the main bag portion, is configured to be inflated under control of a control mechanism in association with a collision mode of a vehicle, and is configured to be interposed between the main bag portion and the vehicle body-side member and to be capable of pushing a region of the occupant protective surface on a side of the auxiliary bag portion, which is inflated, toward a side of the occupant, when the inflation is completed.

8 Claims, 19 Drawing Sheets

(51) Int. Cl.
  *B60R 21/203* (2006.01)
  *B60R 21/2334* (2011.01)
  *B60R 21/16* (2006.01)
  *B60R 21/00* (2006.01)
(52) U.S. Cl.
  CPC .. *B60R 21/2338* (2013.01); *B60R 2021/0009* (2013.01); *B60R 2021/0023* (2013.01); *B60R 2021/161* (2013.01); *B60R 2021/23308* (2013.01); *B60R 2021/23324* (2013.01); *B60R 2021/23382* (2013.01); *B60R 2021/23384* (2013.01)
(58) Field of Classification Search
  CPC .......................................... B60R 2021/23384; B60R 2021/23324; B60R 2021/161; B60R 2021/23308; B60R 2021/23382; B60R 2021/0009; B60R 2021/0023
  USPC ........................... 280/729, 743.1, 743.2, 731
  See application file for complete search history.

(56) References Cited

U.S. PATENT DOCUMENTS

| | | | |
|---|---|---|---|
| 6,773,027 B2* | 8/2004 | Bohn | B60R 21/231 280/729 |
| 7,210,701 B2* | 5/2007 | Meissner | B60R 21/231 280/729 |
| 9,205,798 B1 | 12/2015 | Jindal et al. | |
| 9,321,421 B2* | 4/2016 | Fukawatase | B60R 21/231 |
| 2003/0116945 A1* | 6/2003 | Abe | B60R 21/231 280/729 |
| 2006/0006631 A1 | 1/2006 | Meissner et al. | |
| 2014/0284905 A1* | 9/2014 | Yamaji | B60R 21/239 280/729 |
| 2017/0101071 A1 | 4/2017 | Kruse | |
| 2017/0355341 A1* | 12/2017 | Keyser | B60R 21/203 |
| 2018/0086298 A1* | 3/2018 | Nakanishi | B60R 21/261 |

\* cited by examiner

Fig. 7
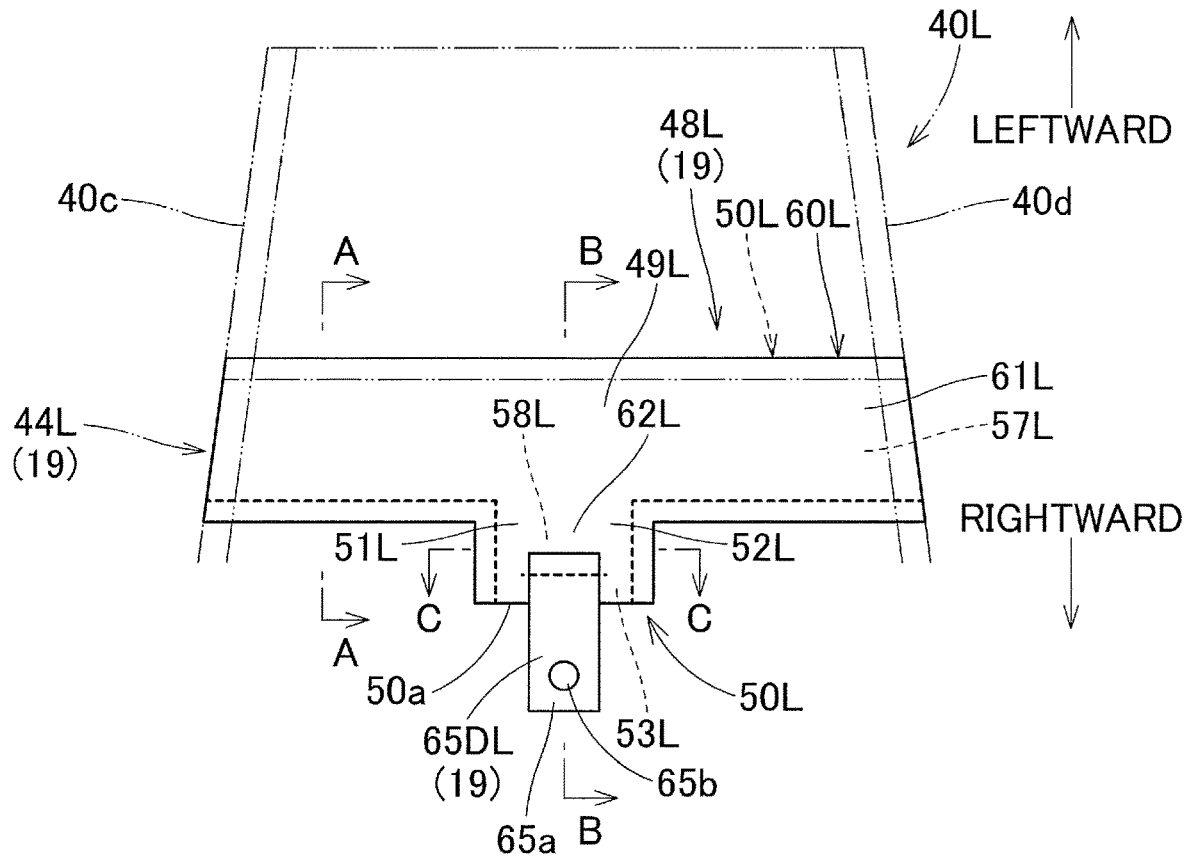
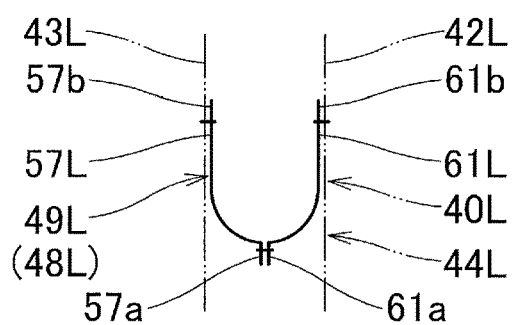
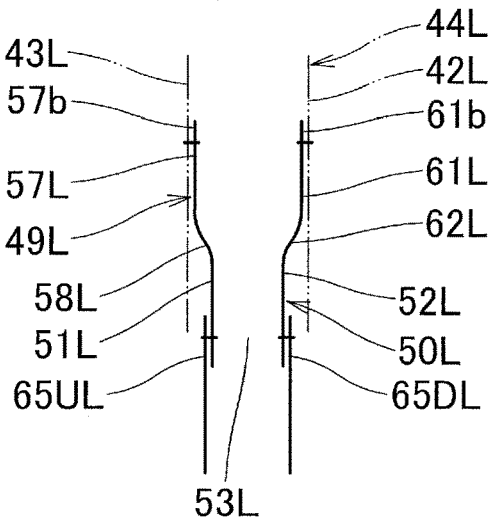
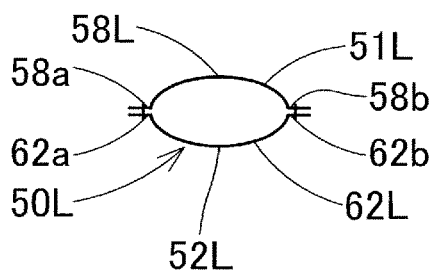

Fig. 8
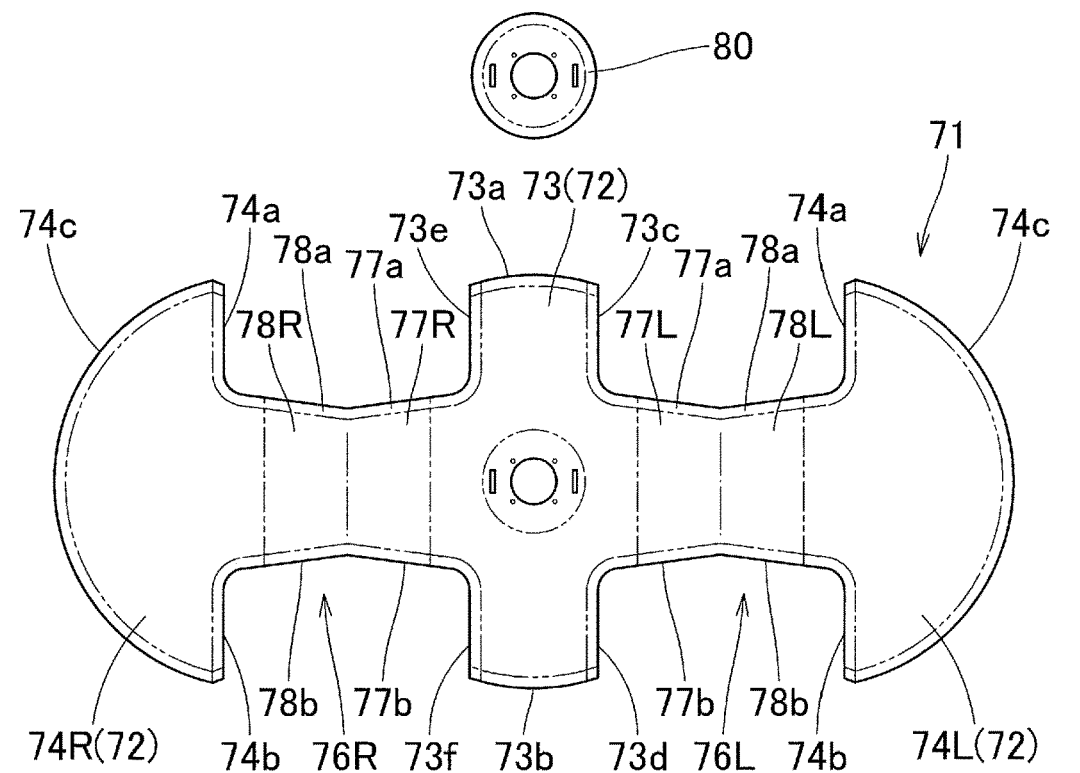
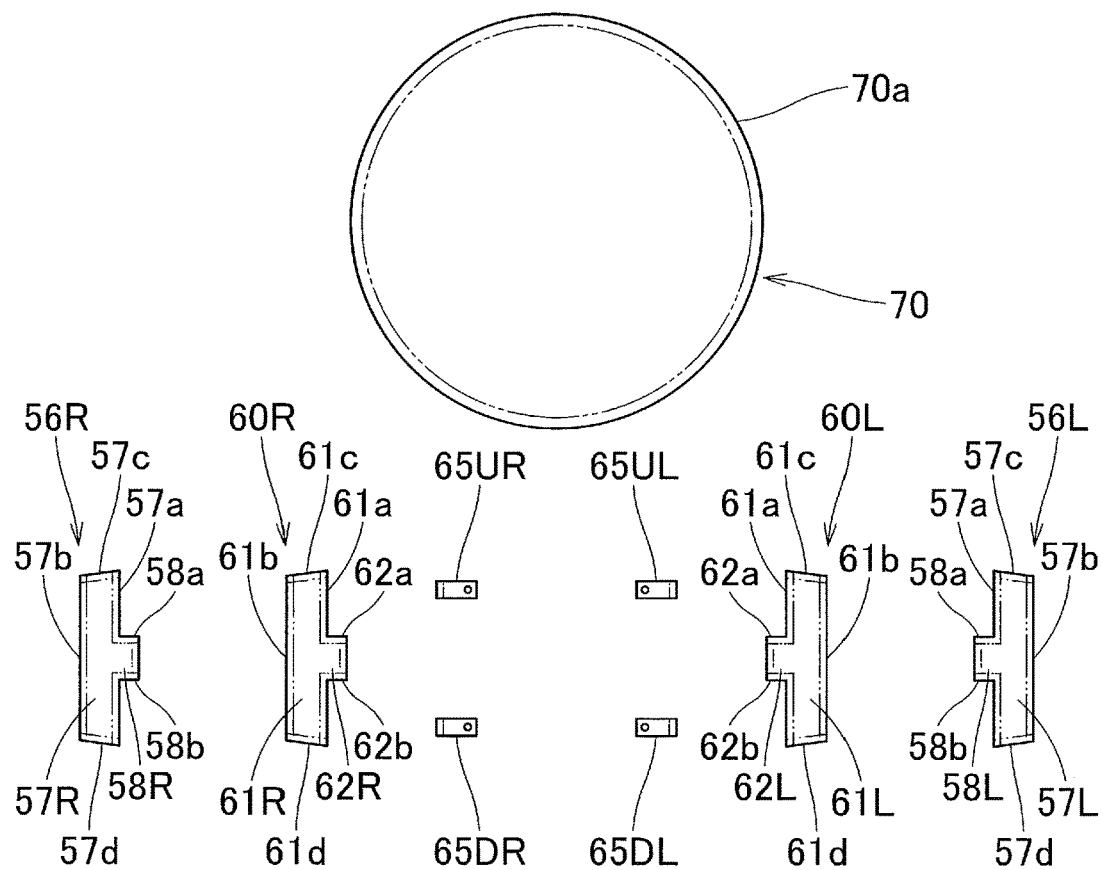

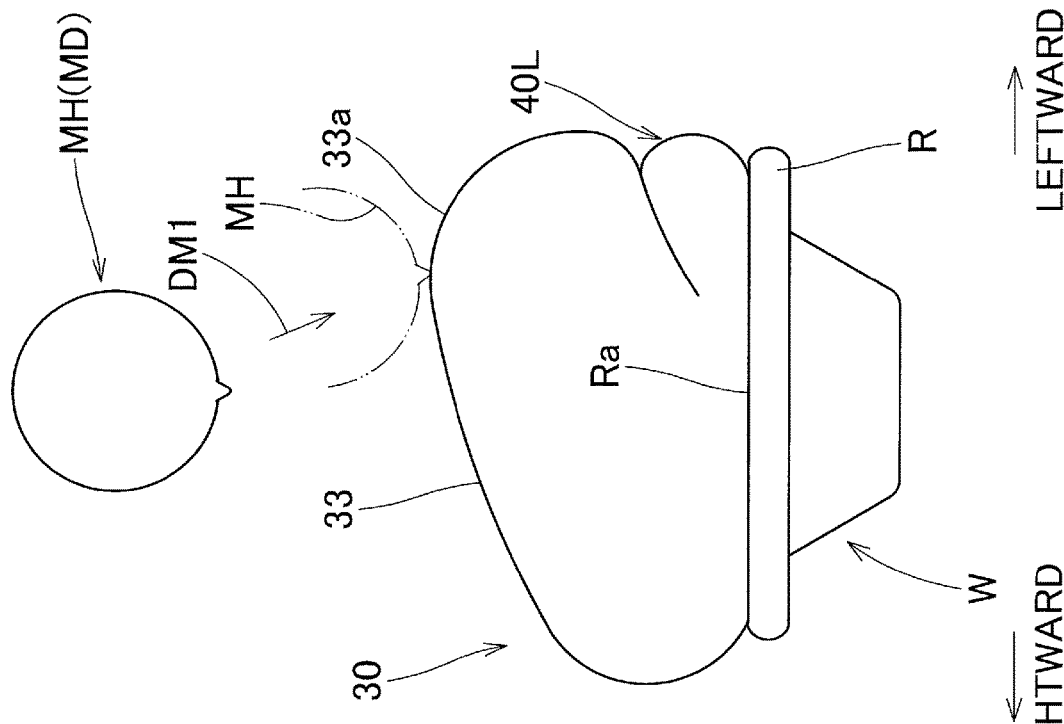
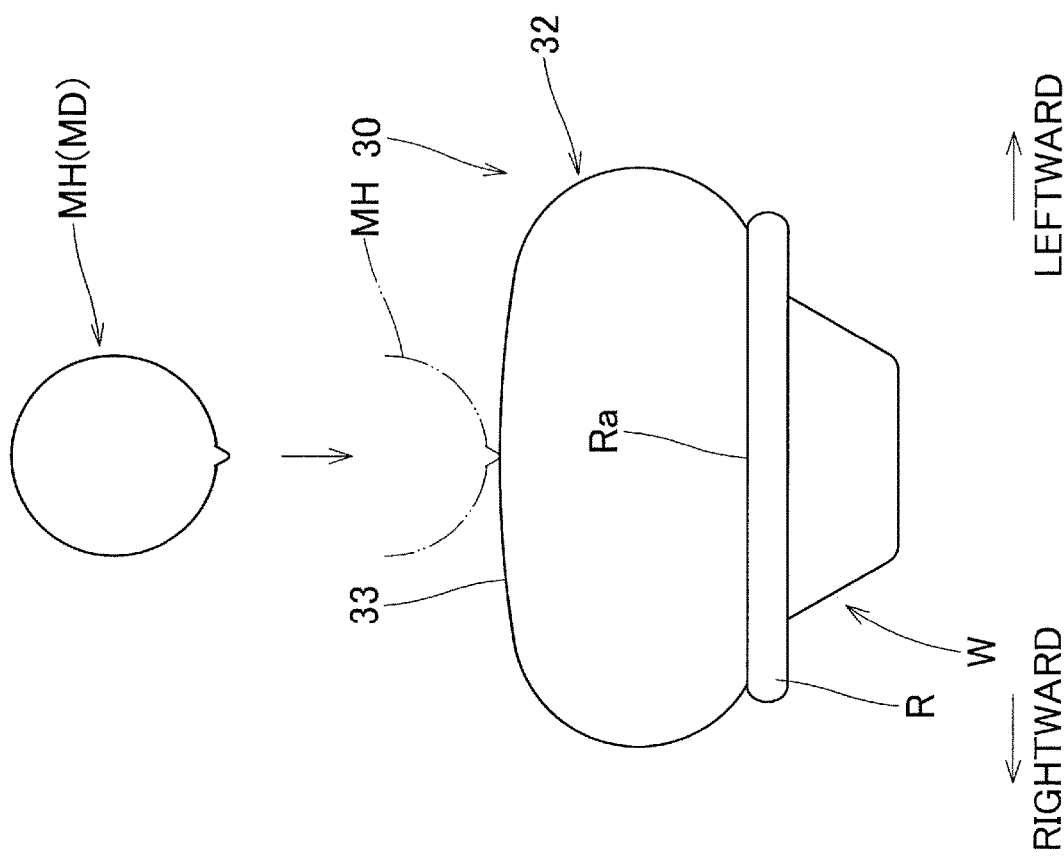

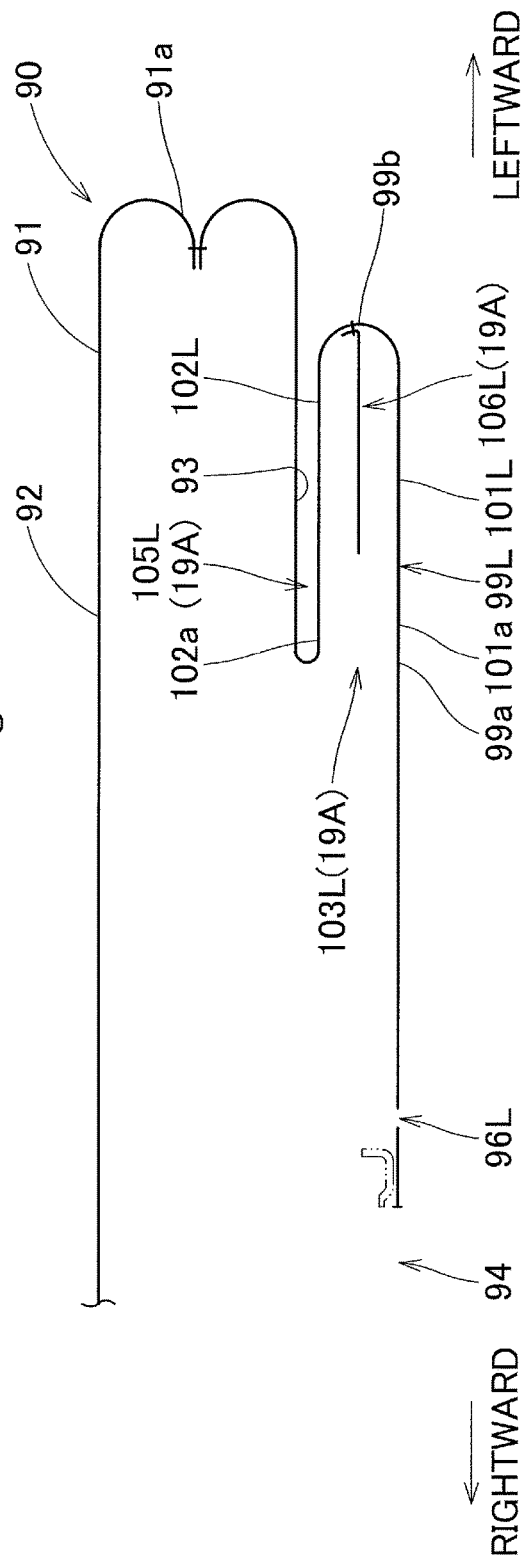
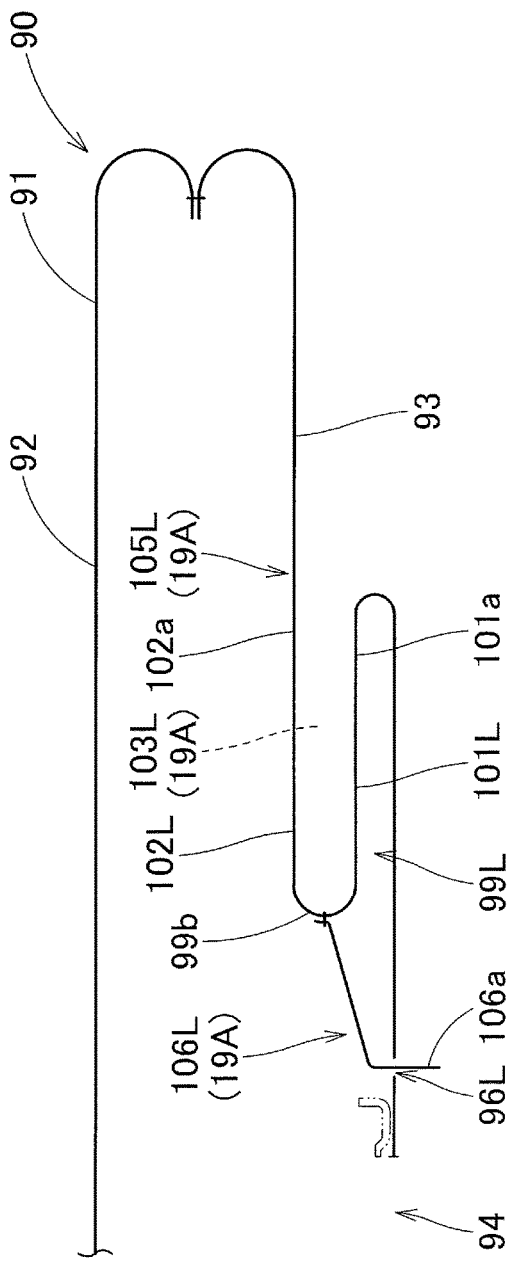

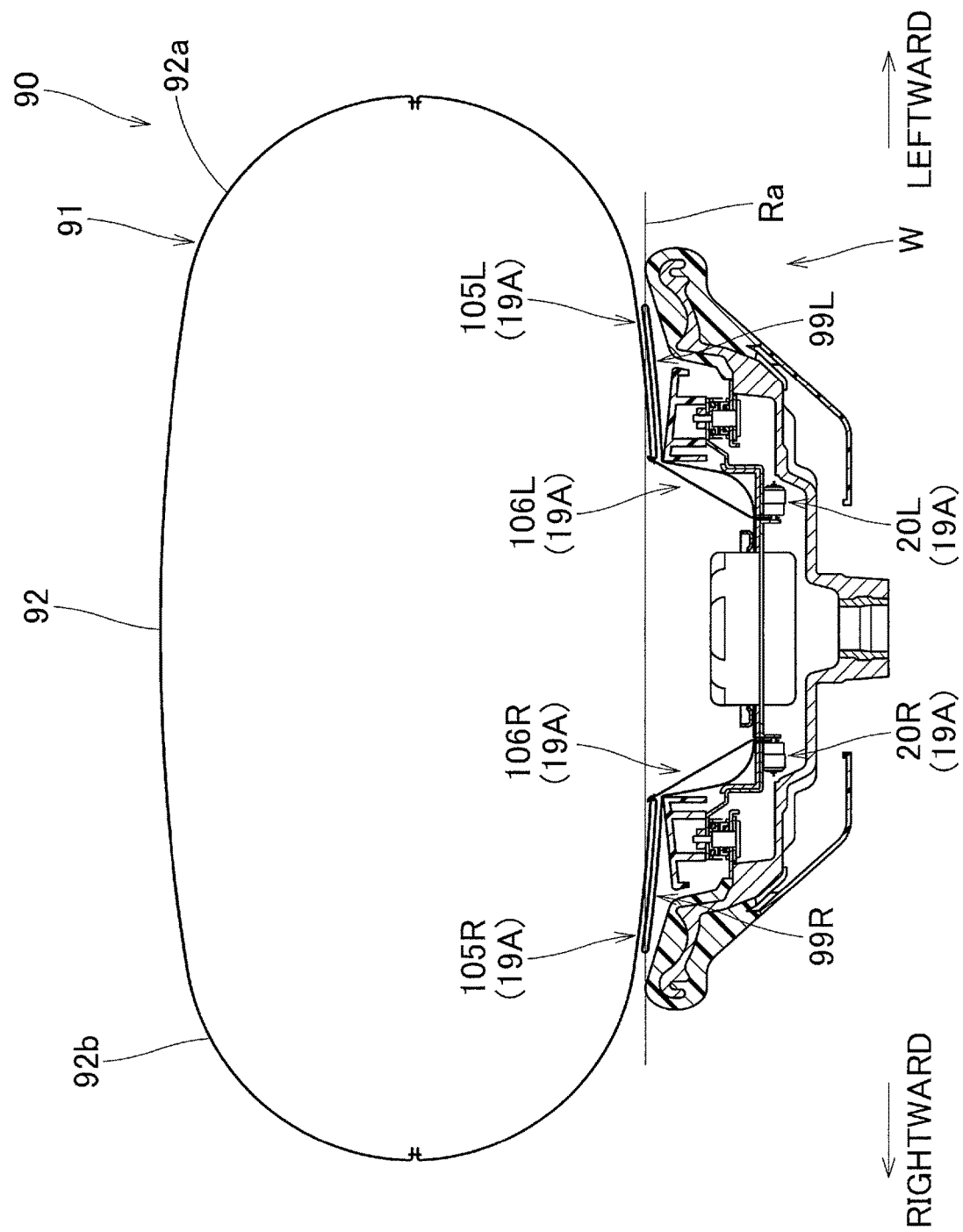

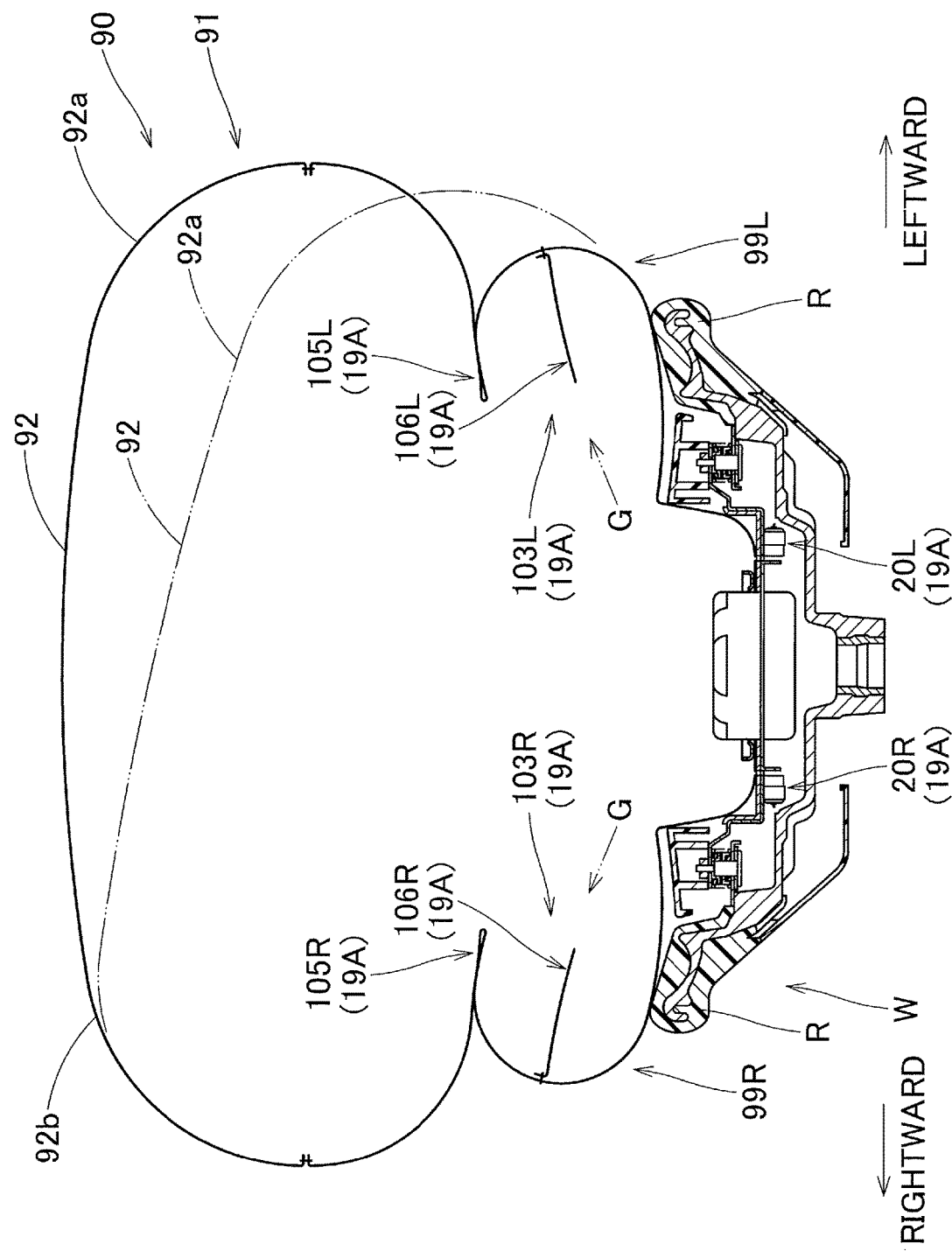

AIRBAG APPARATUS

CROSS REFERENCE TO RELATED APPLICATIONS

The Present application claims priority from Japanese Patent Application No. 2017-125279 of Ishiguro et al., filed on Jun. 27, 2017, the entire disclosure of which is incorporated herein by reference.

BACKGROUND OF THE INVENTION

1. Field of the Invention

The present invention relates to an airbag apparatus including a flexible bag-shaped airbag that is folded and stored in a storage part on a vehicle body side, an inflator that supplies an inflating gas to the airbag, and a control mechanism that controls an inflation shape of the airbag.

2. Description of Related Art

In the related art, as an airbag apparatus, there has been known an airbag apparatus having a configuration disclosed in the specification of U.S. Pat. No. 9,205,798. In the airbag apparatus in the related art, an airbag includes a main bag portion and an auxiliary bag portion of which inflation is controlled by a control mechanism, and the auxiliary bag portion is configured to be inflated during an oblique collision, an offset collision, or the like, so as to be capable of receiving the head of an occupant which moves obliquely forward and to partially project out to the side of the occupant from an occupant protective surface of the main bag portion, which is disposed to face the occupant when the inflation is completed.

However, in the airbag apparatus of the related art, since the auxiliary bag portion is configured to partially project out from the occupant protective surface of the main bag portion, the auxiliary bag portion locally receives the head of the occupant which moves obliquely forward. Therefore, there is room for improvement in smooth receiving of the head of an occupant.

SUMMARY OF THE INVENTION

An object of the invention is to provide an airbag apparatus that is capable of changing an inflation completed shape of an airbag in association with a collision mode and smoothly protecting an occupant with the inflation completed airbag even in a configuration in which the inflation completed shape changes.

The object of the invention can be achieved by an airbag apparatus having the following configuration.

An airbag apparatus includes: a flexible bag-shaped airbag that is able to protect an occupant sitting on a seat of a vehicle and is folded and stored in a storage part on a vehicle body side; an inflator that supplies an inflating gas to the airbag; and a control mechanism that controls an inflation shape of the airbag. The airbag has a main bag portion that is provided with an occupant protective surface which is disposed to face the occupant when inflation is completed, and an auxiliary bag portion that can be disposed at least on one side of a left side or a right side of the storage part, between the main bag portion and a vehicle body-side member which configures a periphery of the storage part, when the inflation is completed. The auxiliary bag portion is configured to enable an inflating gas to flow into an inside thereof through the main bag portion, is configured to be inflated under control of the control mechanism in association with the collision mode of the vehicle, and is configured to be interposed between the main bag portion and the vehicle body-side member and to be capable of pushing a region of the occupant protective surface on a side of the auxiliary bag portion, which is inflated, toward a side of the occupant, when the inflation is completed.

In the airbag apparatus of the invention, the auxiliary bag portion that is inflated under control of the control mechanism is not disposed on the occupant side of the main bag portion but is disposed between the main bag portion and the vehicle body-side member which configures the periphery of the storage part, at least on one side of the left side or the right side of the storage part. The auxiliary bag portion is interposed between the main bag portion and the vehicle body-side member so as to push the occupant protective surface of the main bag portion toward the occupant side when the inflation is completed. Therefore, when the auxiliary bag portion disposed on a side in a collision direction is inflated during an oblique collision, an offset collision, or the like of the vehicle, the auxiliary bag portion which is inflated causes a region (region on the side of the auxiliary bag portion) of the occupant protective surface on a side of a collision direction, which is one side of the left-right direction, to be pushed to the side of the occupant and causes the occupant protective surface to be obliquely disposed with respect to a left-right direction. In other words, the occupant protective surface is disposed to be substantially orthogonal to a movement direction of the head of the occupant. Therefore, it is possible to smoothly receive the head of the occupant which moves obliquely forward by the occupant protective surface of which generation of unevenness is suppressed and which is widely deployed to face the head of the occupant which moves obliquely. In addition, when the auxiliary bag portion is not inflated, the main bag portion is inflated such that the occupant protective surface faces the occupant who does not move obliquely but moves forward, and it is possible to smoothly receive the head of the occupant by the occupant protective surface that is widely deployed even when the auxiliary bag portion is not inflated.

Hence, in the airbag apparatus of the invention, it is possible to change an inflation completed shape of the airbag in association with a collision mode and smoothly protect the occupant with the inflation completed airbag even in a configuration in which the inflation completed shape changes.

In addition, in the airbag apparatus of the invention, it is preferable that the auxiliary bag portions are provided at two positions on both right and left sides of the storage part. In this dispositional configuration, it is possible to change the inflation completed shape of the airbag into more various shapes depending on the collision mode, a physical constitution of the occupant who is protected, or the like. Specifically, the right and left auxiliary bag portions are both inflated, and thereby it is also possible to dispose the auxiliary bag portions so as to push the entire occupant protective surface to the side of the occupant while the occupant protective surface maintains a state of facing the occupant, compared to a non-inflation state of the auxiliary bag portions.

Further, in the airbag apparatus having the configuration described above, it is preferable that the control mechanism includes an inflow port portion through which the auxiliary bag portion communicates with the main bag portion and the inflating gas having flowed into the main bag portion is flowable into the auxiliary bag portion, an opening-closing portion that enables the inflow port portion to be opened or closed, a connection member that extends from the opening-closing portion, and an actuator that is configured to be disposed on a side of the storage part and to be connected to a distal end of the connection member that extends from the opening-closing portion and is capable of canceling connection of the distal end of the connection member in association with a collision mode. It is preferable that the opening-closing portion is configured to maintain a closing state during maintaining or canceling a connection state of the distal end of the connection member to the actuator, to be opened during canceling or maintaining the connection state of the distal end of the connection member to the actuator, and to enable the inflating gas to flow into the inside of the auxiliary bag portion through the inflow port portion.

When the airbag apparatus has this configuration described above, it is possible to cancel or maintain the connection state of the distal end of the connection member to the side of the storage part instantly at the time of actuation of the actuator such that an opening timing of the opening-closing portion can be substantially constant, the opening-closing portion is opened, and thereby it is possible to rapidly inflate the auxiliary bag portion through the inflow port portion.

BRIEF DESCRIPTION OF THE DRAWINGS

FIG. 7 is a partially enlarged plan view illustrating an opening-closing portion that is disposed in the vicinity of a base portion of the auxiliary bag portion in the airbag in FIG. 4.

FIG. 8 is a plan view illustrating a base fabric that configures the airbag in FIG. 4.

FIGS. 13A and 13B are views schematically illustrating a non-inflated state of the auxiliary bag portion during a frontal collision and an inflated state of one auxiliary bag portion during an oblique collision or an offset collision in the driver seat airbag apparatus of the embodiment.

FIGS. 16A and 16B are partially enlarged sectional views illustrating the airbag in FIG. 14 and illustrating a state in which the auxiliary bag portion is flatly deployed and a state in which the auxiliary bag portion enters the inside of the main bag portion.

FIG. 17 is a sectional view schematically illustrating a state in which only a main bag portion is inflated in the driver seat airbag apparatus that uses the airbag in FIG. 14.

FIG. 19 is a sectional view schematically illustrating a state in which the main bag portion and two auxiliary bag portions are inflated in the driver seat airbag apparatus that uses the airbag in FIG. 14.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Hereinafter, an embodiment of the invention will be described with reference to the figures. In the embodiment, a driver seat airbag apparatus M that is mounted on a steering wheel W is exemplified as an airbag apparatus M and is described in detail. The steering wheel W includes a steering wheel main body 1 and the airbag apparatus M that is disposed above a central boss portion B of the steering wheel main body 1. The steering wheel main body 1 includes an annular ring portion R that is gripped during steering, the boss portion B that is disposed at the center of the ring portion R and is fastened to a steering shaft SS, and a plurality of (in a case of the embodiment, four) spoke portions S that connect the boss portion B and the ring portion R.

In this specification, regarding front-rear, up-down, and left-right directions, unless particularly otherwise noted, based on straight steering of the steering wheel W in a mounted state in a vehicle, a direction that is parallel to an axial direction of the steering shaft SS is referred to as the up-down direction, a direction that is orthogonal to the axial direction of the steering shaft SS and is substantially parallel to a front-rear direction of the vehicle is referred to as the front-rear direction, and a direction that is orthogonal to the axial direction of the steering shaft SS and is substantially parallel to a left-right direction of the vehicle is referred to as the left-right direction.

Figure 1:
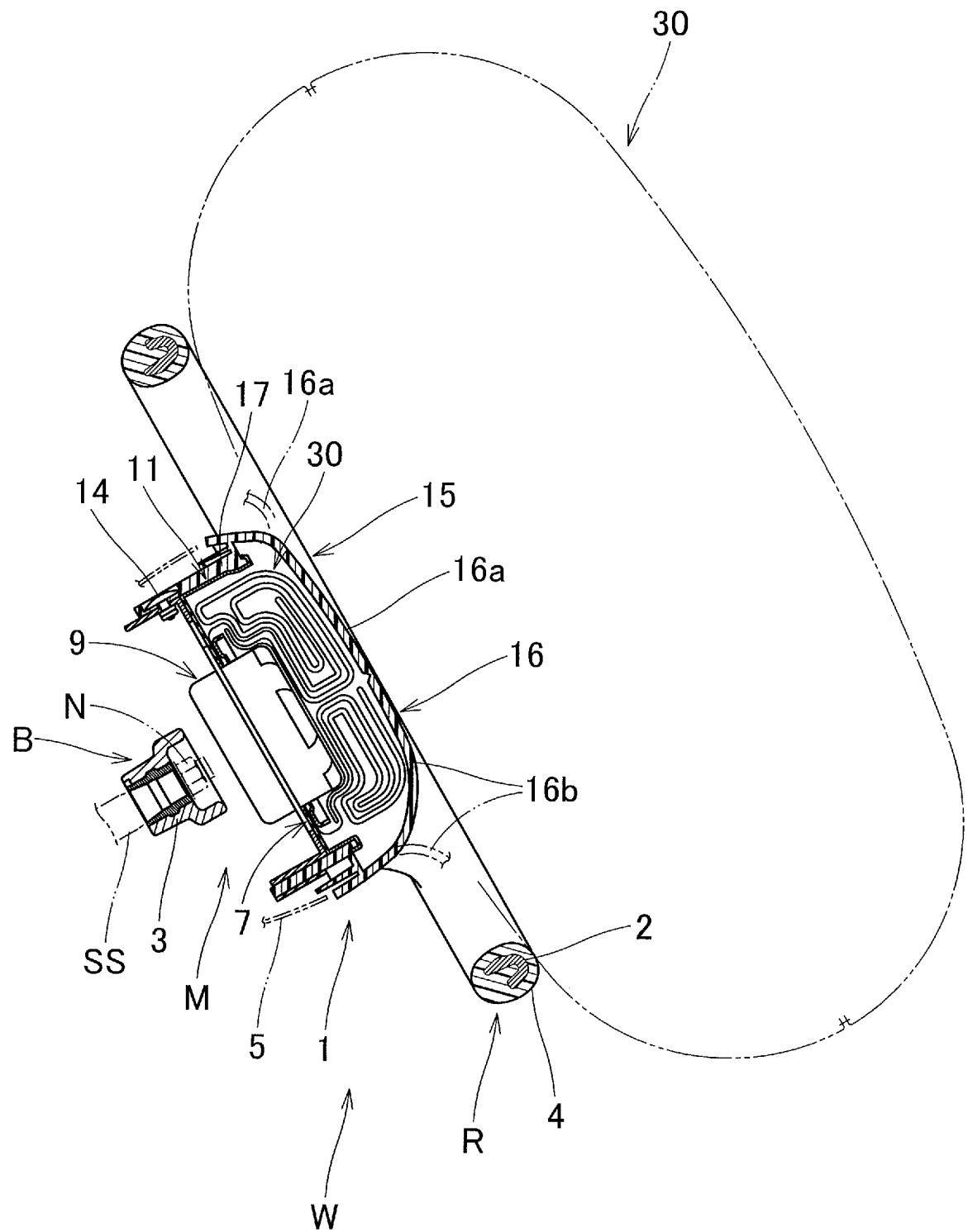
FIG. 1 is a vertical-sectional view schematically illustrating a vehicle mounted state of a driver seat airbag apparatus in an embodiment of the invention.
Figure 2:
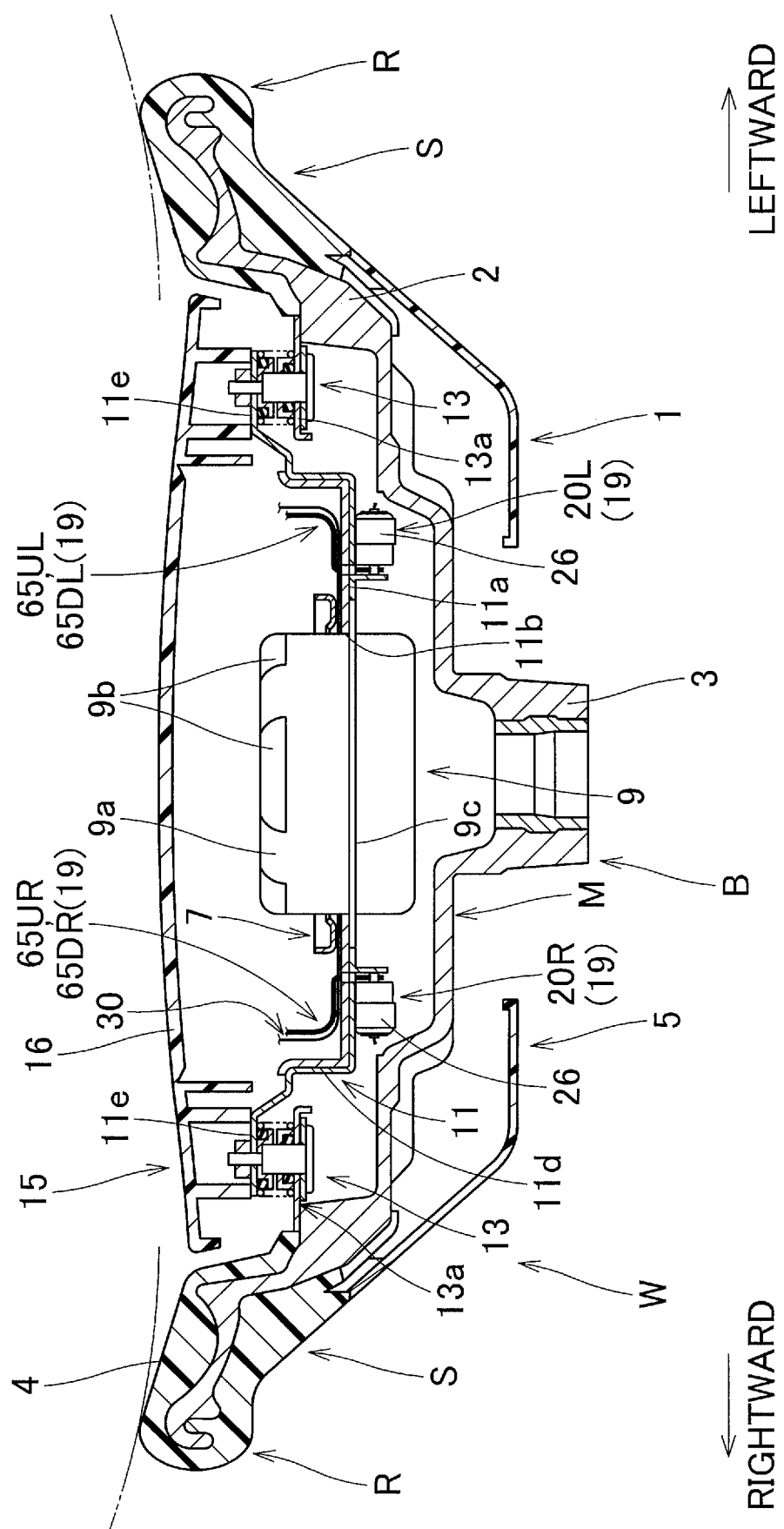
FIG. 2 is a sectional view of the driver seat airbag apparatus on a side in a left-right direction in FIG. 1.

As illustrated in FIGS. 1 and 2, the steering wheel main body 1 includes a cored bar 2 made of a metal such as an aluminum alloy and a synthetic resin coating layer 4 that coats the periphery of the cored bar 2. The cored bar 2 is disposed to connect the portions of the ring portion R, the boss portion B, and the spoke portions S. The coating layer 4 is disposed in a part of the cored bar 2 on the ring portion R and parts of the cored bar 2 on the spoke portions S on the side of the ring portion R. A steel boss 3, through which the steering shaft SS is inserted and is stopped with a nut N, is disposed in the part of the cored bar 2 on the boss portion B. In addition, a lower cover 5 made of a synthetic resin that covers a lower side of the boss portion B is disposed below the steering wheel main body 1.

As illustrated in FIGS. 1 and 2, the airbag apparatus M includes a flexible bag-shaped airbag 30 that is folded and stored in a case 11 as a storage part, an inflator 9 that supplies an inflating gas to the airbag 30, an airbag cover 15 that covers an upper side of the folded airbag 30, the case 11 as the storage part that stores and holds the airbag 30 and the inflator 9, a retainer 7 for attaching the airbag 30 together with the inflator 9 to the case 11, and a control mechanism 19 that controls an inflation shape of the airbag 30. The case 11 stores the airbag cover 15.

The retainer 7 is formed of a substantially quadrangular ring-like plate and has a bolt (not illustrated) that is screwed with a nut to the case 11 on four corners thereof. The retainer 7 presses a circumferential edge of an inflow opening 35 to be described below in the airbag 30, attaches the airbag 30 to the case 11, and attaches the inflator 9 to the case 11.

The inflator 9 includes a columnar main body portion 9a provided with a plurality of gas discharge ports 9b on an upper portion thereof and a flange 9c that projects from an outer circumferential surface of the main body portion 9a. The flange 9c is provided with through-holes (not illustrated) through which bolts (not illustrated) of the retainer 7 pass. The inflator 9 is configured to be electrically connected to a control device (not illustrated) of the vehicle and to operate under control. In a case of the embodiment, the inflator is configured to operate during the frontal collision, the oblique collision, and the offset collision of the vehicle.

Since the case 11 is formed of a plate, as illustrated in FIGS. 1 and 2, the case 11 has a substantially rectangular parallelepiped shape having an upper side that is opened, is disposed above the boss portion B of the steering wheel W, and configures the storage part that stores the folded airbag 30. A bottom wall portion 11a of the case 11 is provided with an insertion hole 11b that is opened in a circular shape through which the main body portion 9a of the inflator 9 can be inserted from below, and a portion on the periphery thereof is provided with through-holes (not illustrated) through which the bolts (not illustrated) of the retainer 7 passes. In addition, the bottom wall portion 11a has, on both right and left sides of the insertion hole 11b, insertion holes 11c through which respective connection members 65UL, 65DL, 65UR, and 65DR to be described below, which configure the control mechanism 19, can pass (refer to FIGS. 3A and 3B). The case 11 has an attachment piece 11e extending outward which is formed on an upper end of a side wall portion 11d that extends from an outer circumferential edge of the bottom wall portion 11a. An attachment board 13a of a horn switch mechanism 13 is attached to the attachment piece 11e. The case 11 is attached and fixed to the cored bar 2 of the steering wheel W by using the attachment board 13a of the horn switch mechanism 13. The attachment of the case 11 to the cored bar 2 by using the attachment board 13a causes the airbag apparatus M to be mounted above the boss portion B of the steering wheel main body 1 that has mounted on the steering shaft SS. In addition, a side wall portion 17 of the airbag cover 15 is attached to the side wall portion 11d of the case 11 by using a rivet 14 or the like (refer to FIG. 1).

The airbag cover 15 is made of a synthetic resin and is provided with a ceiling wall portion 16 that covers an upper side of the stored airbag 30 and a substantially quadrangular cylindrical side wall portion 17 that extends downward from an outer circumferential edge of the ceiling wall portion 16. The ceiling wall portion 16 is provided with two door portions 16a and 16b that are pushed by the airbag 30 that is inflated and are opened toward both front and rear sides.

In addition, in the airbag apparatus M of the embodiment, actuators 20L and 20R that configure the control mechanism 19 are attached to the bottom wall portion 11a of the case 11 on a lower surface side on both right and left sides of the insertion hole 11b (both right and left sides of the inflator 9 when mounted on the vehicle) (refer to FIG. 2). In the embodiment, the actuator 20L disposed on the left side is exemplified and is described in detail.

Figure 3A:
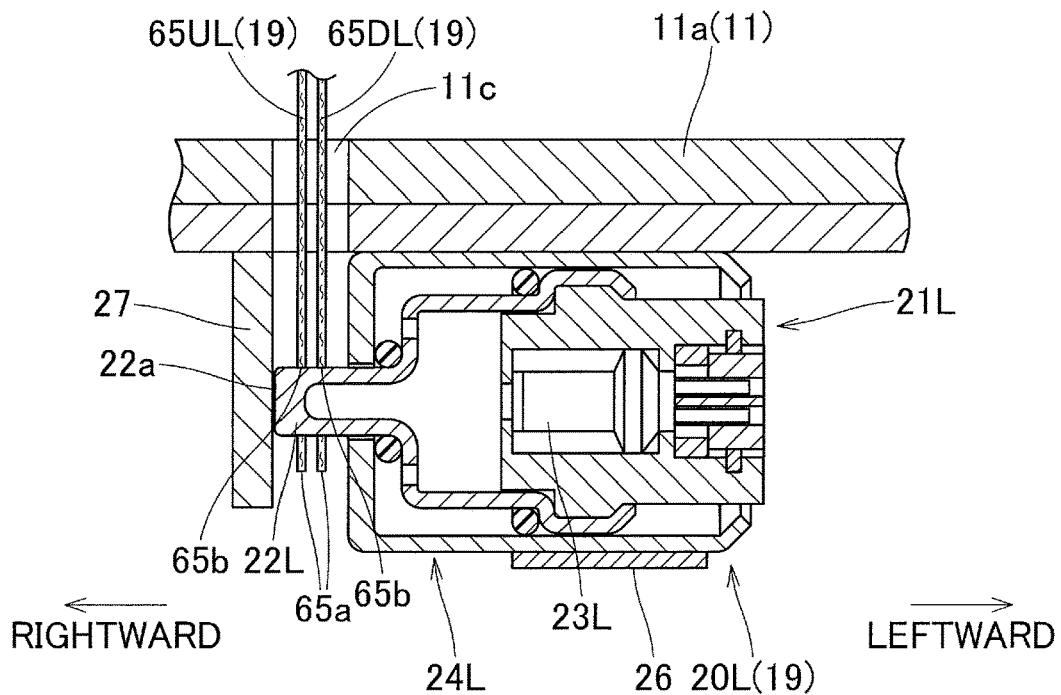
FIGS. 3A and 3B are sectional views schematically illustrating an actuator that is used in the driver seat airbag apparatus in FIG. 1 and illustrate states before and after actuation.
Figure 3B:
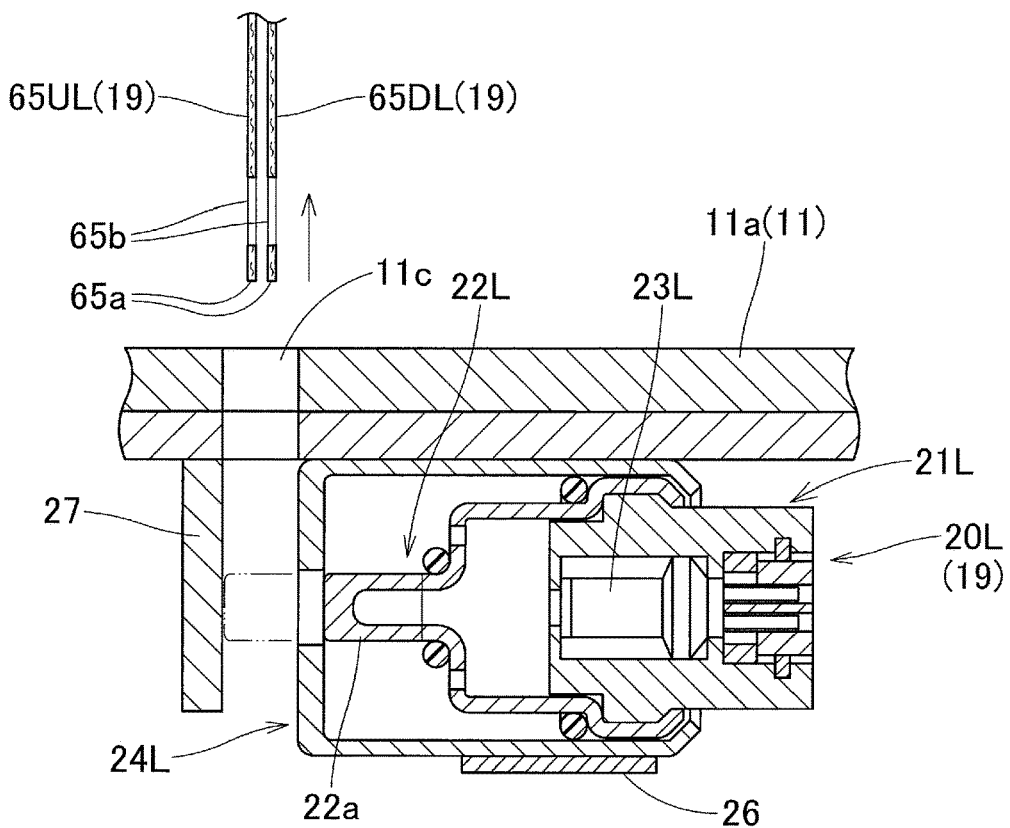

As illustrated in FIGS. 3A and 3B, the actuator 20L is disposed to have its axial direction parallel to the left-right direction. The actuator 20L includes a piston 21L having an actuation pin 22L that is disposed to be parallel to the left-right direction, a squib 23L that is configured to be integral to the piston 21L, and a cylinder case 24L that holds the piston 21L. As illustrated in FIG. 3A, the actuator 20L causes the actuation pin 22L to project inward (a side of the inflator 9 and a right side in FIG. 3) on a side in the left-right direction from the cylinder case 24L in a state before actuation. As illustrated in FIG. 3B, the actuator 20L is configured to generate a driving gas from the squib 23L and to pull the actuation pin 22L into the cylinder case 24L during the actuation. The actuator 20L inserts the actuation pin 22L into through-holes 65b formed on sides of distal ends 65a of connection members 65UL and 65DL which project from the insertion holes 11c formed in the bottom wall portion 11a of the case 11 such that the actuator is mounted on the vehicle in a state in which the actuator is connected to the distal ends 65a of the connection members 65UL and 65DL. In addition, the actuator 20L is held by an attachment bracket 26 so as to be attached to the bottom wall portion 11a of the case 11, and a support piece portion 27 that projects from the case 11 supports the side of a distal end 22a of the actuation pin 22L before the actuation. When the actuator 20L is actuated, the actuation pin 22L is pulled into the cylinder case 24L and is released from a connection state to the distal ends 65a of the connection members 65UL and 65DL.

Figure 4:
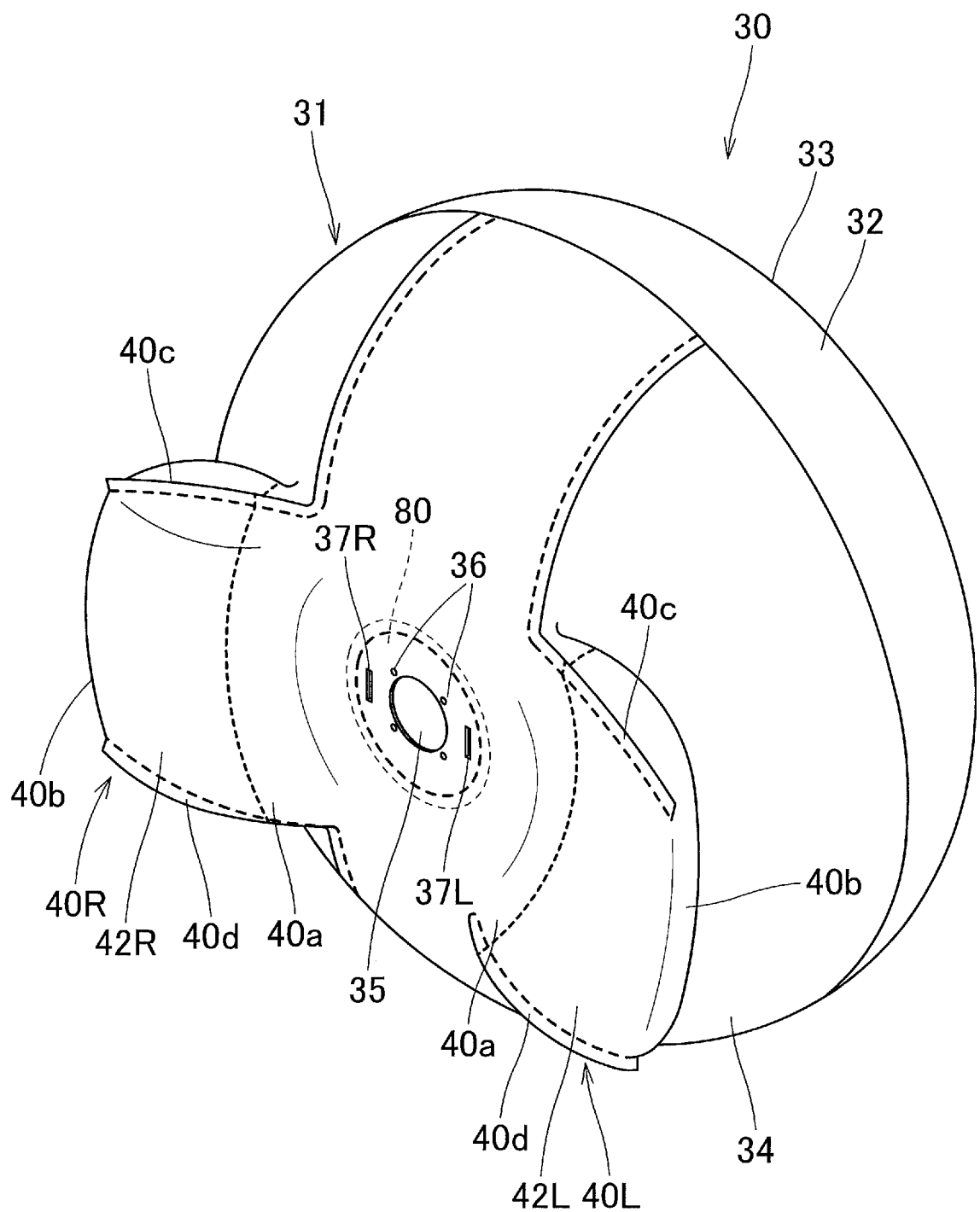
FIG. 4 is a perspective view illustrating a state in which an airbag that is used in the driver seat airbag apparatus in FIG. 1 is inflated in a single body.
Figure 9A:
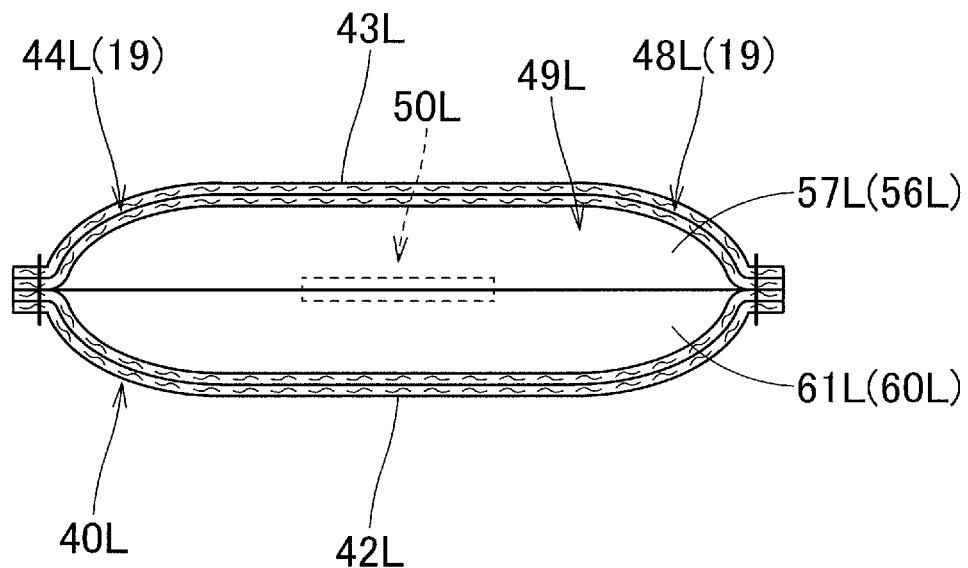
FIGS. 9A and 9B are sectional views schematically illustrating a closing state and an opening state of the opening-closing portion that is disposed in the vicinity of the base portion of the auxiliary bag portion in the airbag in FIG. 4.
Figure 9B:
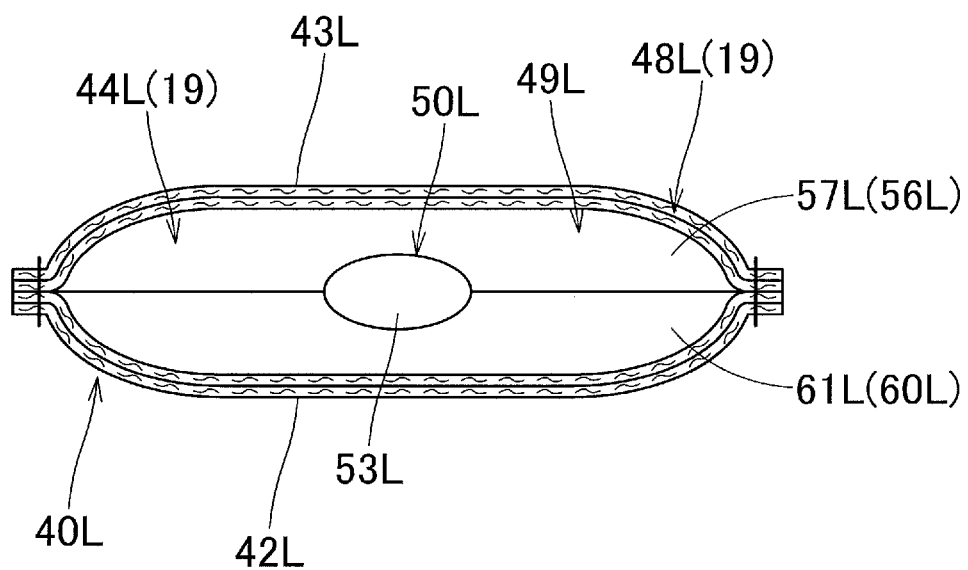

The airbag 30 has a flexible bag-shaped bag main body 31 and opening-closing portions 48L and 48R configuring the control mechanism 19 which are disposed in regions of a left auxiliary bag portion 40L and a right auxiliary bag portion 40R to be described below in the bag main body 31. As illustrated in FIGS. 4, 9A, and 9B, the bag main body 31 has a main bag portion 32 that is inflated to cover the steering wheel W when inflation is completed and the left auxiliary bag portion 40L and the right auxiliary bag portion 40R which are disposed on both right and left sides of the inflow opening 35 to be described below on a side of a back surface of the main bag portion 32 (on the side of the steering wheel main body 1 that is on the side of the lower surface).

Figure 5:
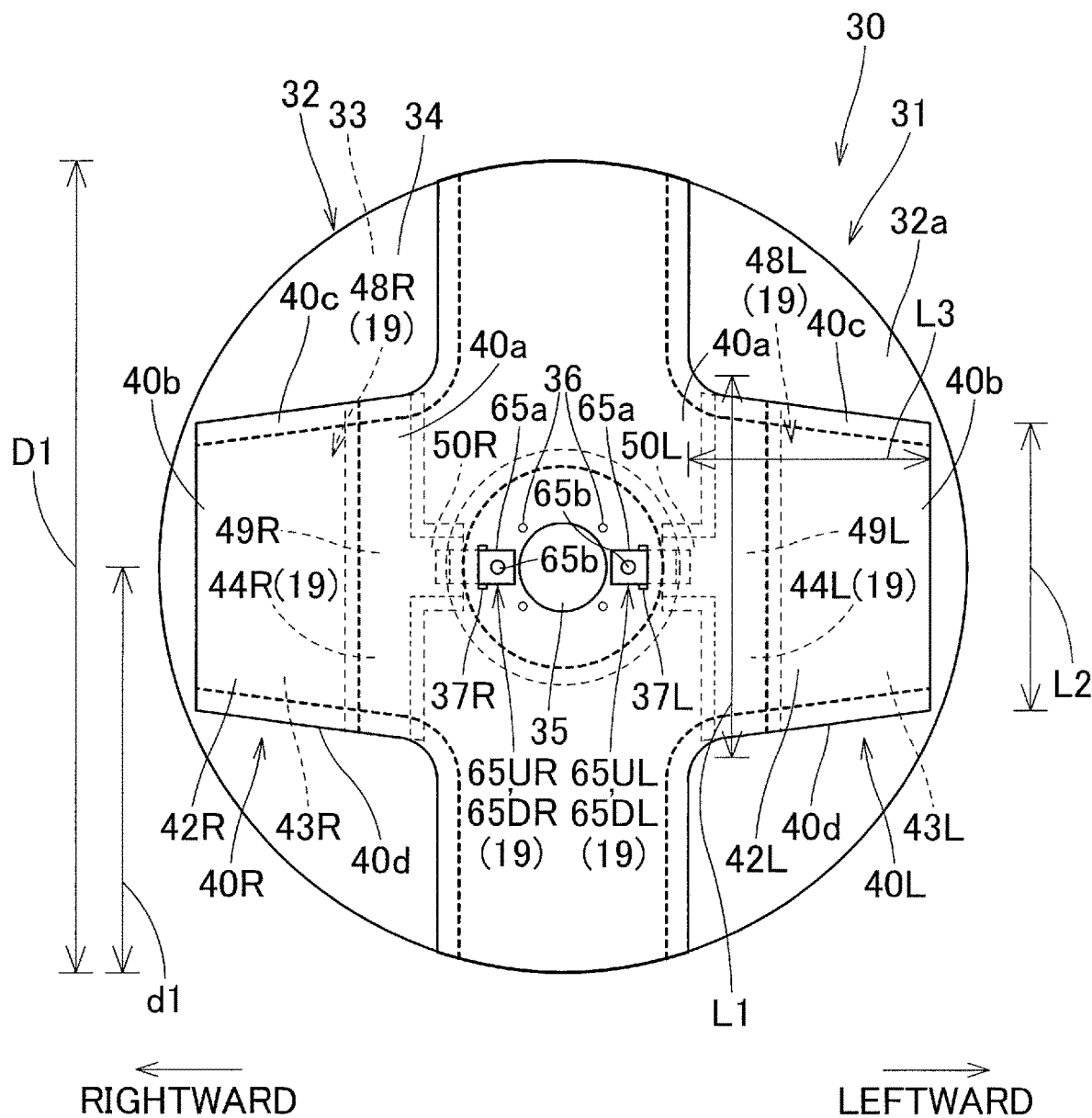
FIG. 5 is a bottom view illustrating a flatly deployed state of the airbag in FIG. 4.

The main bag portion 32 is configured to have a substantially circular shape as an external inflation completed shape viewed from above is set to be able to cover an entire surface of the ring portion R of the steering wheel W on an upper surface side. Moreover, the main bag portion 32 has a substantially elliptical shape as an external shape viewed from above. The main bag portion 32 has a vehicle body-side wall portion 34 that is disposed on the side of the steering wheel main body 1 (the side of the ring portion R)

which is the side of the vehicle body when the inflation is completed and an occupant-side wall portion 33 that is disposed on a side of a driver MD as an occupant. The external shapes of the vehicle body-side wall portion 34 and the occupant-side wall portion 33 are the substantial circular shape. Therefore, the main bag portion has a bag shape by joining (sewing) outer circumferential edges of the vehicle body-side wall portion 34 and the occupant-side wall portion 33 to each other. As illustrated in FIGS. 4 and 5, the inflow opening 35 for allowing the inflating gas to flow into the inside is formed to be opened in a circular shape at the center of the vehicle body-side wall portion 34. A circumferential edge of the inflow opening 35 is provided with attachment holes 36 for allowing the bolts (not illustrated) of the retainer 7 for attaching the airbag 30 to the bottom wall portion 11a of the case 11 to pass through. In addition, through-holes 37L and 37R are formed on a side of a left edge and a side of a right edge of the inflow opening 35, respectively. The through-holes 37L and 37R are parts for causing the sides of the distal ends 65a of the connection members 65UL, 65DL, 65UR, and 65DR to project to the outside, the connection members extending from the opening-closing portions 48L and 48R that enable inflow port portions 44L and 44R formed in the left auxiliary bag portion 40L and the right auxiliary bag portion 40R to be opened or closed. The through-holes 37L and 37R are formed at slightly outward positions from a region that is pressed by the retainer 7 on the circumferential edge of the inflow opening 35 (refer to FIG. 6). The occupant-side wall portion 33 is configured to have an occupant protective surface that is disposed to face the driver MD, who is the occupant, when the inflation is completed. The occupant-side wall portion 33 is disposed to be substantially parallel to a ring surface Ra of the ring portion R in the steering wheel W when only the main bag portion 32 is inflated (refer to FIGS. 9A and 12).

The left auxiliary bag portion 40L and the right auxiliary bag portion 40R including the inflow port portions 44L and 44R and the opening-closing portions 48L and 48R which are disposed inside, are symmetrical from the left side to the right side. In the embodiment, the left auxiliary bag portion 40L is exemplified and is described in detail, and the detailed description of the right auxiliary bag portion 40R is omitted.

Figure 6:
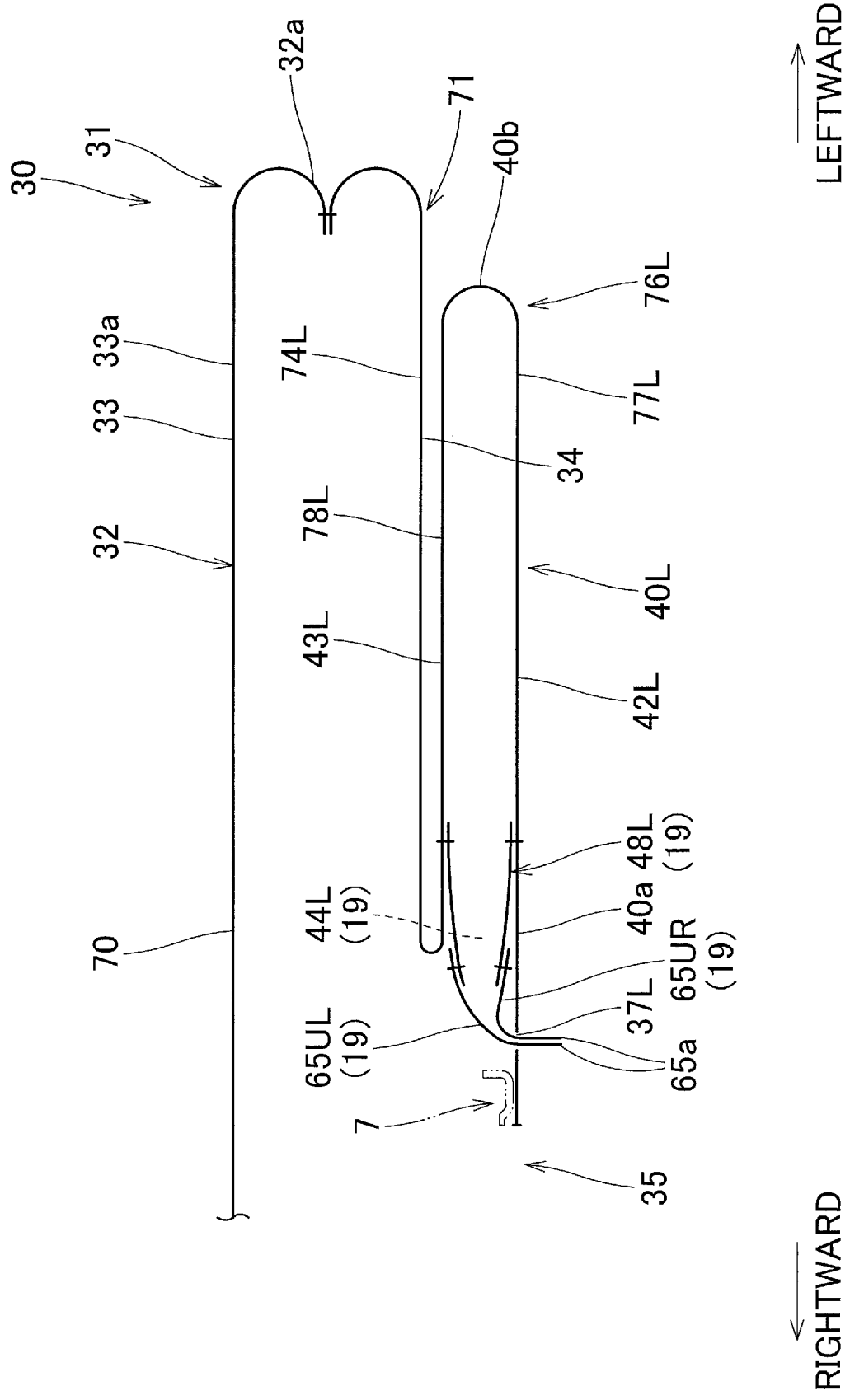
FIG. 6 is a partially enlarged sectional view of the airbag in FIG. 4.

As illustrated in FIGS. 5 and 6, in a state in which the airbag 30 is flatly deployed, the left auxiliary bag portion 40L is formed to extend from the inflow opening 35 toward the left side. As illustrated in FIG. 5, the left auxiliary bag portion 40L is configured to have a substantially trapezoidal external shape obtained in the flatly deployed state with a slightly wider width on a side of a base portion 40a, which is the side of the inflow opening 35, than on the side of the distal end 40b that is disposed on an outward side in the left-right direction. Specifically, the left auxiliary bag portion 40L is configured to join circumferential edges of a vehicle body-side wall portion 42L that is disposed on the side of the steering wheel main body 1 (the side of the ring portion R) when the inflation is completed and a main bag-side wall portion 43L that is disposed on the side of the main bag portion 32 when the inflation is completed. The vehicle body-side wall portion 42L and the main bag-side wall portion 43L has substantially the same trapezoidal external shapes. Therefore, the inflation completed shape of the left auxiliary bag portion 40L is the substantially trapezoidal plate shape that slightly narrows on the side of the distal end 40b. The left auxiliary bag portion 40L is provided with the inflow port portion 44L through which the left auxiliary bag portion communicates with the main bag portion 32 and an inflating gas G having flowed into the main bag portion 32 is flowable into the inside of the left auxiliary bag portion, on the side of the base portion 40a, which is the side of the inflow opening 35. In addition, the left auxiliary bag portion 40L causes the vehicle body-side wall portion 42L to be linked from the circumferential edge of the inflow opening 35 when the inflating gas flows into the inside of the left auxiliary bag portion through the inflow port portion 44L and the left auxiliary bag portion is inflated, and thus the left auxiliary bag portion is interposed between the steering wheel main body 1 (specifically, a part from the spoke portion S to the ring portion R) and the main bag portion 32 (refer to FIGS. 10 and 11). A width dimension L1 on a side in the front-rear direction of a part of the left auxiliary bag portion 40L on the side of the base portion 40a is set to about two fifths of an outer diameter dimension D1 of the main bag portion 32 in the flatly deployed state. In addition, a width dimension L2 on a side in the front-rear direction of a part of the left auxiliary bag portion 40L on the side of the distal end 40b is set to about three fourths of the width dimension L1 on the side in the front-rear direction of the part on the side of the base portion 40a. A width dimension (length dimension on a side in the left-right direction) L3 from the base portion 40a to the distal end 40b of the left auxiliary bag portion 40L is set to about three fifths of a radius dimension d1 of the main bag portion 32. The left auxiliary bag portion 40L has a configuration in which the position of the distal end 40b is substantially coincident with an outer circumferential edge 32a of the main bag portion 32 (refer to FIG. 5). When the inflating gas flows into the inside and the left auxiliary bag portion 40L is inflated, the size of the left auxiliary bag portion is set to a size by which a left region 33a (a region on the side of the left auxiliary bag portion 40L, that is, a region that is disposed above the left auxiliary bag portion 40L when the inflation is completed) in the occupant protective surface (occupant-side wall portion 33) of the main bag portion 32 can be pushed to the upper side, which is the side of the driver. In a case of the embodiment, the left auxiliary bag portion 40L is folded along with the main bag portion 32 and is mounted on the vehicle in a state in which the vehicle body-side wall portion 42L and the main bag-side wall portion 43L overlap each other so as to be flatly deployed and in a state in which the left auxiliary bag portion is disposed on a side of a lower surface of the main bag portion 32.

The inflow port portion 44L configures the control mechanism 19 and, thus, is configured of a part of the left auxiliary bag portion 40L on the side of the base portion 40a, which communicates with the main bag portion 32. The inflow port portion 44L is provided with the opening-closing portion 48L that enables the inflow port portion 44L to be opened or closed.

As illustrated in FIGS. 5 to 7, the opening-closing portion 48L is provided with a partition portion 49L that is disposed to form a partition into the left auxiliary bag portion 40L and the main bag portion 32 in the region of the inflow port portion 44L (on the side of the base portion 40a of the left auxiliary bag portion 40L) and a cylindrical portion 50L that is formed to project from the partition portion 49L to the side of the left auxiliary bag portion 40L and has an opening 53L on a side of a distal end 50a. In addition, the opening-closing portion 48L is provided such that the connection members 65UL and 65DL extend from a circumferential wall (an upper wall portion 51L and a lower wall portion 52L) of the cylindrical portion 50L. Specifically, since the opening-closing portion 48L is configured of two of an upper base member 56L and a lower base member 60L which have the same external shape and overlap each other on a side in the up-down direction (refer to FIG. 8), the upper base member 56L and the lower base member 60L are provided with strip-shaped partition constituting portions 57L and 61L and cylinder shape constituting portions 58L and 62L which extend inward from inner edges 57a and 61a of the partition constituting portions 57L and 61L, which are positioned at the center side in the left-right direction, respectively. The partition constituting portions 57L and 61L have substantially the same length dimension as the width dimension on the side of the front-rear direction of the base side part (part of the inflow port portion 44L) of the vehicle body-side wall portion 42L and the main bag-side wall portion 43L of the left auxiliary bag portion 40L. The cylinder shape constituting portions 58L and 62L are formed at positions which are substantially the center of the front-rear direction of the partition constituting portions 57L and 61L. As illustrated in FIG. 7, the opening-closing portion 48L is configured as follows. The inner edges 57a and 61a of the partition constituting portions 57L and 61L are joined (sewn) each other. In the cylinder shape constituting portions 58L and 62L, the front edges 58a and 62a are joined (sewn) each other, and rear edges 58b and 62b are joined (sewn) each other. The outer edges 57b and 61b of the partition constituting portions 57L and 61L in the upper base member 56L and the lower base member 60L are joined (sewn) to the vehicle body-side wall portion 42L and the main bag-side wall portion 43L of the left auxiliary bag portion 40L, respectively, all across the entire circumference. The front edges 57c and 61c and rear edges 57d and 61d of the partition constituting portions 57L and 61L are joined (sewn) to a front edge 40c and a rear edge 40d of the left auxiliary bag portion 40L, respectively, all across the entire circumference. The connection members 65UL and 65DL are provided on the side of the distal end 50a of the cylindrical portion 50L so as to extend from the side of the upper wall portion 51L and the side of the lower wall portion 52L which are formed from the cylinder shape constituting portions 58L and 62L, respectively. The two connection members 65UL and 65DL have a strip shape that is formed from a flexible base member. The through-holes 65b, into which the actuation pin 22L of the actuator 20L described above can be inserted, are formed on the sides of the distal ends 65a of the connection members 65UL and 65DL. The length dimension of the connection members 65UL and 65DL is set to a dimension by which it is possible to pull each of the upper wall portion 51L and the lower wall portion 52L of the cylindrical portion 50L and to maintain a closing state on the side of the distal end 50a of the cylindrical portion 50L, when a connection state with the actuator 20L is maintained and the airbag 30 is inflated.

In the airbag apparatus M of the embodiment, the control mechanism 19 that controls an inflated shape of the airbag 30 is configured to include the inflow port portions 44L and 44R through which the left auxiliary bag portion 40L, the right auxiliary bag portion 40R, and the main bag portion 32 communicate with each other, the opening-closing portions 48L and 48R that enable the inflow port portions 44L and 44R to be opened or closed, the connection members 65UL, 65DL, 65UR, and 65DR that extend from the opening-closing portions 48L and 48R, and the actuators 20L and 20R that are connected to the distal ends 65a of the connection members 65UL, 65DL, 65UR, and 65DR. The actuators 20L and 20R, together with the inflator 9, are electrically connected to a control device (not illustrated) of the vehicle and are actuated under control.

Specifically, in the case of the embodiment, at the frontal collision of the vehicle, both of the actuators 20L and 20R are actuated or not actuated depending on a physical constitution or a seating position of the occupant. At the oblique collision or the offset collision of the vehicle, only the actuator disposed on the side in the collision direction is actuated. The actuator 20L is set to be actuated at the time of actuation substantially at the same time as the inflator 9. In a case where the airbag 30 is completely inflated in a state in which the actuators 20L and 20R are not actuated, the connection members 65UL, 65DL, 65UR, and 65DR are maintained in the connection state to the actuators 20L and 20R. The cylindrical portions 50L and 50R in the opening-closing portions 48L and 48R are pulled to the side of the case 11 by the connection members 65UL, 65DL, 65UR, and 65DR and the closing state on the side of the distal end 50a is maintained (refer to FIG. 9A). In this manner, only the main bag portion 32 is inflated in a state in which the inflating gas does not flow into the inside of the left auxiliary bag portion 40L and the right auxiliary bag portion 40R (refer to FIG. 10). In a case where the airbag 30 is completely inflated in a state in which the actuators 20L and 20R are actuated, the actuation pins 22L and 22R are pulled out from the through-holes 65b of the connection members 65UL, 65DL, 65UR, and 65DR during the actuation of the actuators 20L and 20R, and the connection of the connection members 65UL, 65DL, 65UR, and 65DR to the side of the case 11 is canceled. Therefore, the sides of the distal ends 50a of the cylindrical portions 50L and 50R are opened (refer to FIG. 9B) and, further, are inverted. The inflating gas flows into the inside of the left auxiliary bag portion 40L and the right auxiliary bag portion 40R through openings 53L and 53R, and thereby the main bag portion 32, the left auxiliary bag portion 40L, and the right auxiliary bag portion 40R are completely inflated (refer to FIG. 12). To be more specifically described, when the airbag 30 is inflated in a state in which the actuators 20L and 20R are not actuated, the connection members 65DL and 65DR disposed on the lower side (side of the vehicle body-side wall portion 34) also pull regions of the partition portions 49L and 49R on the lower side. At this time, the connection members 65UL and 65UR disposed on the upper side (side of the occupant-side wall portion 33) pulls regions of the partition portions 49L and 49R on the upper side, and floating of the region of the partition portions 49L and 49R on the upper side is suppressed. In this manner, it is possible to accurately maintain the closing state of the cylindrical portions 50L and 50R.

Next, base members that configure the airbag 30 will be described. As illustrated in FIG. 8, the bag main body 31 of the embodiment is configured to have a substantially disc-shaped occupant-side panel 70 that configures the occupant-side wall portion 33 of the main bag portion 32, a vehicle body-side panel 71 that configures the vehicle body-side wall portion 34 of the main bag portion 32, the left auxiliary bag portion 40L, and the right auxiliary bag portion 40R, and a disc-shaped reinforcing fabric 80 for reinforcing the circumferential edge of inflow opening 35. The vehicle body-side panel 71 is integrally configured to dispose a left auxiliary bag constituting portion 76L and a right auxiliary bag constituting portion 76R between main bag constituting portions 72 which are configured by dividing the vehicle body-side wall portion 34 of the main bag portion 32 into substantially three parts in the left-right direction, respectively. To be more specifically described, the main bag constituting portion 72 includes a strip-shaped central part 73 that configures a center part of the vehicle body-side wall portion 34 in the center in the left-right direction, a left part 74L that configures a left side part of the vehicle body-side wall portion 34, and a right part 74R that configures a right side part of the vehicle body-side wall portion 34. The left auxiliary bag constituting portion 76L that configures the left auxiliary bag portion 40L is disposed between the left part 74L and the central part 73 so as to connect the left part 74L and the central part 73, and the right auxiliary bag constituting portion 76R that configures the right auxiliary bag portion 40R is disposed between the central part 73 and the right part 74R so as to connect the central part 73 and the right part 74R. The vehicle body-side panel 71 has a symmetrical shape in the left-right direction. The left auxiliary bag constituting portion 76L and the right auxiliary bag constituting portion 76R are formed to be connected to each other on the side in the left-right direction and are provided with central parts 77L and 77R that configure the vehicle body-side wall portions 42L and 42R and end-side parts 78L and 78R that configure the main bag-side wall portions 43L and 43R. The left auxiliary bag constituting portion 76L and the right auxiliary bag constituting portion 76R form the left auxiliary bag portion 40L and the right auxiliary bag portion 40R by joining (sewing) front edges 77a and 78a to each other and rear edges 77b and 78b to each other of the central parts 77L and 77R and the end-side parts 78L and 78R, respectively. The vehicle body-side panel 71 has a substantially circular external shape so as to be substantially the same shape as the occupant-side panel 70, the external shape obtained in a state in which the front edges 77a and 78a are joined (sewed) to each other and the rear edges 77b and 78b are joined (sewed) to each other in the central parts 77L and 77R and the end-side parts 78L and 78R of the left auxiliary bag constituting portion 76L and the right auxiliary bag constituting portion 76R, and an inner front edge 74a of the left part 74L and a left front edge 73c of the central part 73, an inner rear edge 74b of the left part 74L and a left rear edge 73d of the central part 73, an inner front edge 74a of the right part 74R and a right front edge 73e of the central part 73, an inner rear edge 74b of the right part 74R and a right rear edge 73f of the central part 73 are joined (sewed) respectively.

In the case of the embodiment, the occupant-side panel 70, the vehicle body-side panel 71, and the reinforcing fabric 80 which configure the bag main body 31, the upper base members 56L and 56R and the lower base members 60L and 60R which configure the opening-closing portions 48L and 48R, respectively, and the connection members 65UL, 65DL, 65UR, and 65DR are formed from a woven fabric made of polyester yarn or polyamide yarn.

Next, manufacturing of the airbag 30 of the embodiment will be described. The upper base members 56L and 56R and the lower base members 60L and 60R which configure the opening-closing portions 48L and 48R are respectively sewed in advance by using a sewing thread from the inner edges 57a and 61a of the partition constituting portions 57L, 57R, 61L, and 61R to each other to the front edges 58a and 62a to each other and the rear edges 58b and 62b to each other of the cylinder shape constituting portions 58L, 58R, 62L, and 62R. In addition, the ends of the connection members 65UL, 65DL, 65UR, and 65DR are sewed to the distal ends side of the cylinder shape constituting portions 58L, 58R, 62L, and 62R of the upper base members 56L and 56R and the lower base members 60L and 60R by using the sewing thread. In addition, the reinforcing fabric 80 is sewed to the vehicle body-side panel 71. The partition constituting portions 57L, 57R, 61L, and 61R overlap the vehicle body-side panel 71 such that positions of the front edges 57c and 61c and the rear edges 57d and 61d are coincident with respective positions of the front edges 77a and 78a and rear edges 77b and 78b of the central parts 77L and 77R and the end-side parts 78L and 78R of the left auxiliary bag constituting portion 76L and the right auxiliary bag constituting portion 76R. Outer edges 57b and 61b of the partition constituting portions 57L, 57R, 61L, and 61R are sewed to the central parts 77L and 77R and the end-side parts 78L and 78R of the left auxiliary bag constituting portion 76L and the right auxiliary bag constituting portion 76R, respectively, by using the sewing thread. Subsequently, the upper base member 56L and the lower base member 60L which configure the opening-closing portion 48L are interposed therebetween, and the vehicle body-side panel 71 is folded back at a boundary part between the central part 77L and the end-side part 78L of the left auxiliary bag constituting portion 76L. The front edges 77a and 78a of the central part 77L and the end-side part 78L are sewed to each other to the inner front edge 74a of the left part 74L and the left front edge 73c of the central part 73 by using the sewing thread. In addition, the rear edges 77b and 78b of the central part 77L and the end-side part 78L are sewed to each other to the inner rear edge 74b of the left part 74L and the left rear edge 73d of the central part 73 by using the sewing thread, the central part 73 and the left part 74L are sewed, and the left auxiliary bag portion 40L is simultaneously formed. At this time, the front edges 57c and 61c and the rear edges 57d and 61d of the partition constituting portions 57L and 61L are simultaneously sewed, and the partition portion 49L of the opening-closing portion 48L is joined to the inflow port portion 44L of the left auxiliary bag portion 40L all across the entire circumference of the circumferential edges. Similarly, when the right auxiliary bag portion 40R is formed while the central part 73 and the right part 74R are sewed and the partition portion 49R of the opening-closing portion 48R is joined to the inflow port portion 44R of the right auxiliary bag portion 40R, it is possible to form the vehicle body-side wall portion 34 of the main bag portion 32 which has a substantially circular shape. Subsequently, the left auxiliary bag portion 40L and the right auxiliary bag portion 40R are brought into contact with an outer circumferential surface of the occupant-side panel 70, and the occupant-side panel 70 overlap the vehicle body-side wall portion 34 such that the outer circumferential edge of the occupant-side panel 70 is coincident with the vehicle body-side wall portion 34. An outer circumferential edge 70a of the occupant-side panel 70 is sewed to outer edges 74c of the left part 74L and the right part 74R and a front edge 73a and a rear edge 73b of the central part 73 by using the sewing thread. Then, when the sewed part is inverted using the inflow opening 35, it is possible to manufacture the airbag 30.

The airbag 30 is folded in a state in which the retainer 7 is stored inside while the connection members 65UL, 65DL, 65UR, and 65DR project from the through-holes 37L and 37R. Specifically, the airbag 30 is folded to be stored in the case 11 in a state in which the left auxiliary bag portion 40L and the right auxiliary bag portion 40R overlap the main bag portion 32 which is in the flatly deployed state. The airbag 30 is folded and wrapped with a predetermined wrapping material that can be broken so as not to be unfolded. Subsequently, while the bolts (not illustrated) of the retainer 7 pass through the bottom wall portion 11a, the distal ends 65a of the connection members 65UL, 65DL, 65UR, and 65DR are caused to project from the insertion hole 11c, and the airbag 30 is stored on the bottom wall portion 11a of the case 11. The actuation pin 22L and 22R of the actuators 20L and 20R which are disposed on a side of a back surface of the bottom wall portion 11a of the case 11 are inserted into respective through-holes 65b on the side of the distal ends 65a of the connection members 65UL, 65DL, 65UR, and 65DR. The side of the distal ends of the actuation pins 22L and 22R are supported by a support piece portion 27, and the connection members 65UL, 65DL, 65UR, and 65DR are connected to the actuators 20L and 20R. Further, the main body portion 9a of the inflator 9 is inserted into the insertion hole of the bottom wall portion 11a from below. Then, when the bolts (not illustrated) of the retainer 7 pass through the flange 9c and are screwed with nuts, it is possible to attach the airbag 30 and the inflator 9 to the case 11. Further, the case 11 is covered with the airbag cover 15, the side wall portions 11d and 17 are connected to each other by using a rivet 14 or the like, and thereby the airbag cover 15 is attached to the case 11. Then, when the horn switch mechanism 13 is attached to the attachment piece 11e of the case 11, it is possible to assemble the airbag apparatus M. The airbag apparatus M can be mounted on the vehicle when the airbag apparatus is attached to the steering wheel main body 1 fastened to the steering shaft SS in advance by using the attachment board 13a of the horn switch mechanism 13.

In the airbag apparatus M of the embodiment, when the inflating gas is discharged from the gas discharge port 9b of the inflator 9 during the frontal collision, the oblique collision, or the offset collision of the vehicle, the airbag 30 is inflated with the inflating gas flowing into the inside thereof and pushes and opens the door portions 16a and 16b of the airbag cover 15. The airbag 30 projects upward from the case 11 through an opening that is formed by pushing and opening the door portions 16a and 16b of the airbag cover 15, is deployed and inflated while projecting upward, and is completely inflated to cover the upper surface of the steering wheel W, as illustrated by two-dot chain lines in FIGS. 1 and 2 and FIG. 10.

Figure 11:
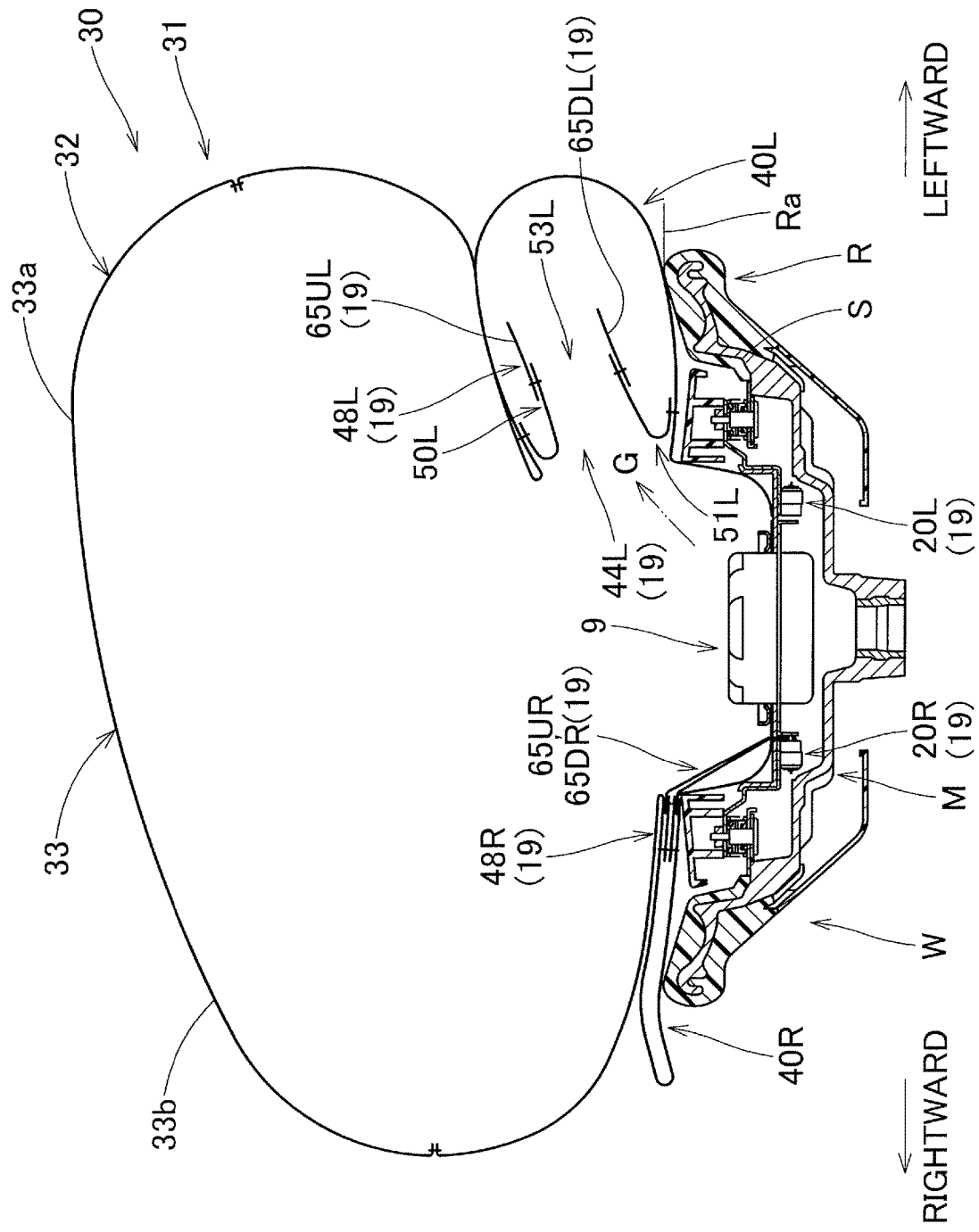
FIG. 11 is a sectional view schematically illustrating a state in which the main bag portion and one auxiliary bag portion are inflated in the driver seat airbag apparatus of the embodiment.

In the airbag apparatus M of the embodiment, the left auxiliary bag portion 40L and the right auxiliary bag portion 40R that are inflated under control of the control mechanism 19 are not disposed on the occupant side of the main bag portion 32 but are disposed between the main bag portion 32 and the vehicle body-side member (in the case of the embodiment, the spoke portion S or the ring portion R) which configures the periphery of the case 11, on the left side or the right side of the case 11 as the storage part. The left auxiliary bag portion 40L and the right auxiliary bag portion 40R are configured to be interposed between the main bag portion 32 and the spoke portion S or the ring portion R as the vehicle body-side member so as to push the occupant protective surface (occupant-side wall portion 33) of the main bag portion 32 toward the side of the driver MD, who is the occupant, when the inflation is completed. Therefore, as illustrated in FIGS. 11 and 13B, when the left auxiliary bag portion 40L disposed on the side in the collision direction is inflated during the oblique collision, the offset collision, or the like of the vehicle, the left auxiliary bag portion 40L which is inflated causes the left region 33a as the region on the side in the collision direction (region on the side of the left auxiliary bag portion 40L) which is one side of the rightward-leftward direction, to be pushed to the driver MD side and causes the occupant-side wall portion 33 to be obliquely disposed with respect to the left-right direction (the ring surface Ra). In other words, as illustrated in FIG. 13B, the occupant-side wall portion 33 (occupant protective surface) is disposed to be substantially orthogonal to a movement direction DM1 of the head MH of the driver MD. Therefore, it is possible to smoothly receive the head MH of the driver MD, which moves obliquely forward, by the occupant-side wall portion 33 (occupant protective surface) of which generation of unevenness is suppressed and which is widely deployed to face the head of the occupant which moves obliquely. In addition, when the left auxiliary bag portion 40L and the right auxiliary bag portion 40R are not inflated, as illustrated in FIG. 13A, the main bag portion 32 is inflated to be substantially parallel to the ring surface Ra such that the occupant-side wall portion 33 (occupant protective surface) faces the driver MD who does not move obliquely but moves forward, and it is possible to smoothly receive the head MH of the driver MD by the occupant-side wall portion 33 (occupant protective surface) that is widely deployed even when the left auxiliary bag portion 40L and the right auxiliary bag portion 40R are not inflated. In addition, in a case where the left auxiliary bag portion 40L is not inflated and only the right auxiliary bag portion 40R is inflated, as illustrated by a two-dot chain line in FIG. 12, the right region 33b of the occupant-side wall portion 33 is pushed to the side of the driver and is obliquely disposed with respect to the left-right direction (the ring surface Ra).

Hence, in the airbag apparatus M of the embodiment, it is possible to change the inflation completed shape of the airbag 30 in association with the collision mode and smoothly protect the driver MD, who is the occupant, with the inflation completed airbag 30 even in the configuration in which the inflation completed shape changes.

Figure 10:
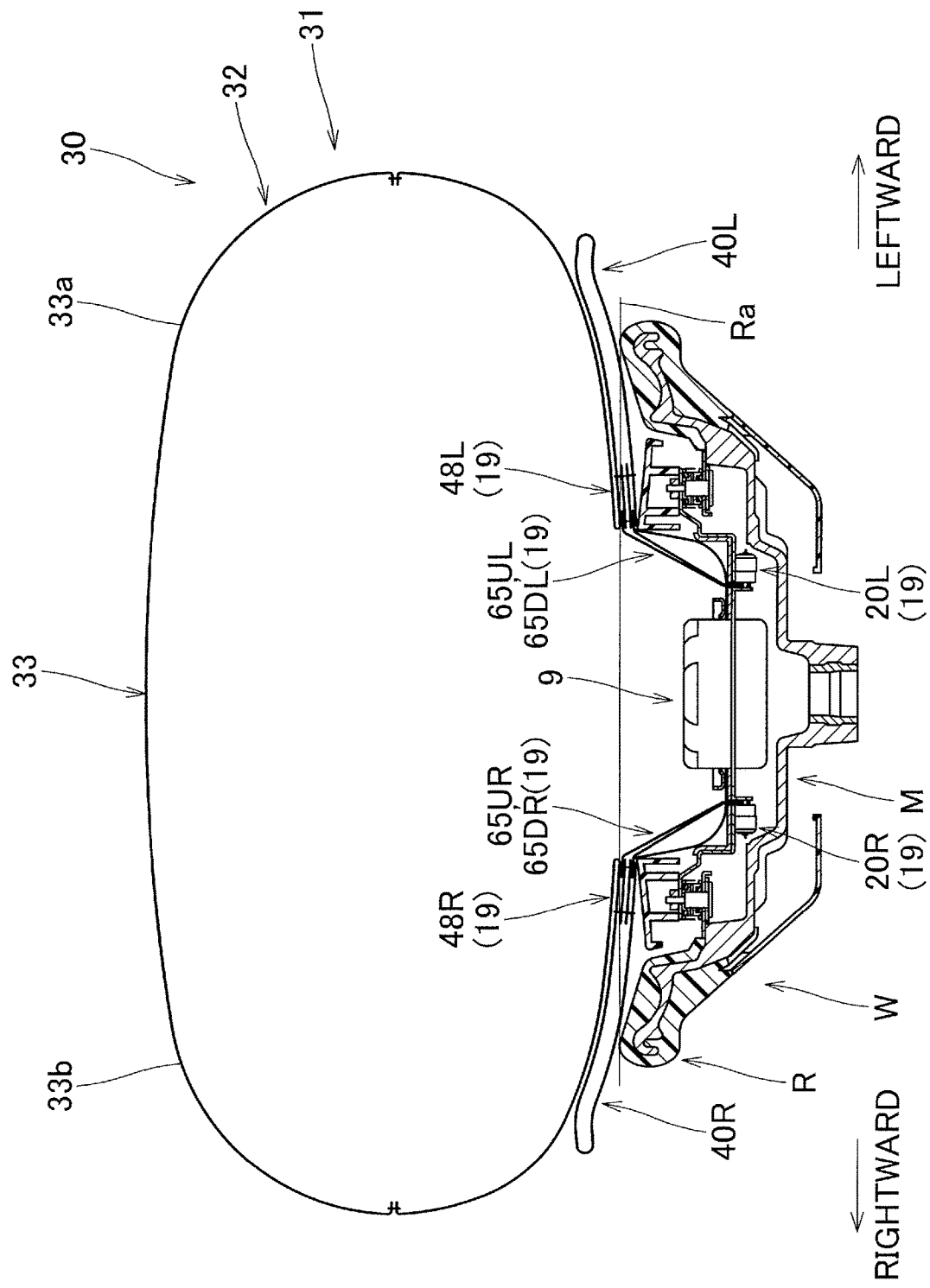
FIG. 10 is a sectional view schematically illustrating a state in which only a main bag portion is inflated in the driver seat airbag apparatus of the embodiment.
Figure 12:
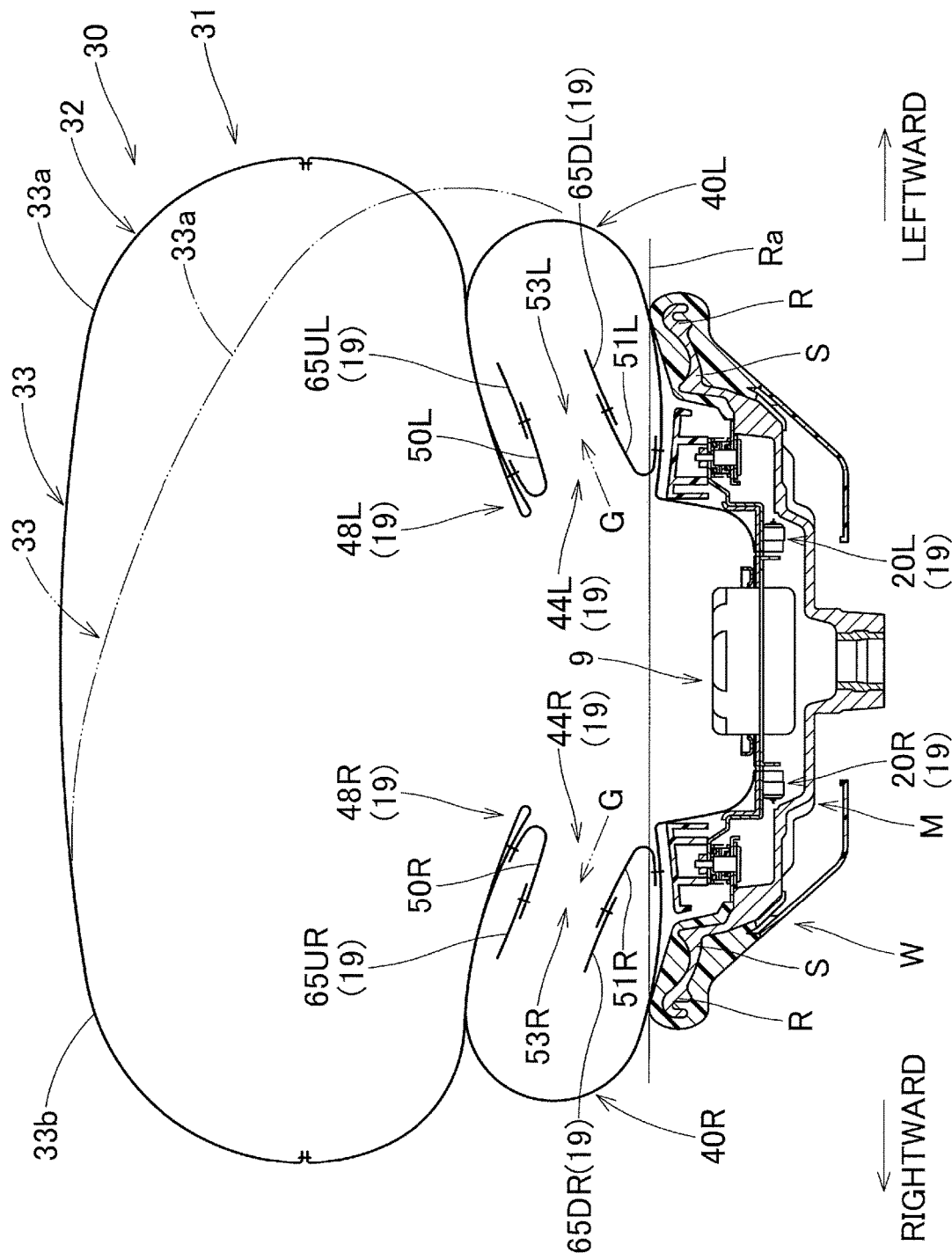
FIG. 12 is a sectional view schematically illustrating a state in which the main bag portion and the two auxiliary bag portions are inflated in the driver seat airbag apparatus of the embodiment.

In addition, in the airbag apparatus M of the embodiment, the left auxiliary bag portion 40L and the right auxiliary bag portion 40R are provided at two positions on both right and left sides of the case 11. Therefore, it is possible to change the inflation completed shape of the airbag 30 into more various shapes depending on the collision mode, the physical constitution of the occupant who is protected, or the like. Specifically, in the airbag apparatus M of the embodiment, as illustrated in FIG. 12, it is possible to inflate both of the left auxiliary bag portion 40L and the right auxiliary bag portion 40R. In a case where both of the left auxiliary bag portion 40L and the right auxiliary bag portion 40R are inflated, the entire occupant protective surface (occupant-side wall portion 33) can be disposed to be pushed to the side of the driver while maintaining the state of facing the driver (while maintaining a state of being substantially parallel to the ring surface Ra), compared to a case where the left auxiliary bag portion 40L and the right auxiliary bag portion 40R are not inflated as illustrated in FIG. 10. Such an inflation mode is suitable for a case of protecting a small occupant such as a woman, for example.

Further, in the airbag apparatus M of the embodiment, the control mechanism 19 that controls the inflated shape of the airbag 30 is configured to include the inflow port portions 44L and 44R through which the left auxiliary bag portion 40L, the right auxiliary bag portion 40R, and the main bag portion 32 communicate with each other; the opening-closing portions 48L and 48R that enable the inflow port portions 44L and 44R to be opened and closed; the connection members 65UL, 65DL, 65UR, and 65DR that extend from the opening-closing portions 48L and 48R; and the actuators 20L and 20R that are disposed on the side of the case 11 and are connected to the distal ends of the connection members 65UL, 65DL, 65UR, and 65DR. The opening-closing portions 48L and 48R are configured to maintain the closing state during maintaining the connection state of the distal ends of the connection members 65UL, 65DL, 65UR, and 65DR to the actuators 20L and 20R, and are configured to enable the inflating gas to flow into the inside of the left auxiliary bag portion 40L and the right auxiliary bag portion 40R through the inflow port portions 44L and 44R, to open the cylindrical portions 50L and 50R formed in the opening-closing portions 48L and 48R to open when canceling the connection state of the distal ends of the connection members 65UL, 65DL, 65UR, and 65DR from the actuators 20L and 20R. Therefore, in the airbag apparatus M of the embodiment, it is possible to instantly cancel the connection state of the distal ends of the connection members 65UL, 65DL, 65UR, and 65DR to the side of the case 11 when the actuators 20L and 20R are actuated, and thus it is possible to achieve a constant opening timing of the cylindrical portions 50L and 50R of the opening-closing portions 48L and 48R. In addition, the cylindrical portions 50L and the 50R are opened, and thereby it is possible to rapidly inflate the left auxiliary bag portion 40L and the right auxiliary bag portion 40R through the openings 53L and 53 R (the inflow port portions 44L and 44R).

Further, in the airbag apparatus M of the embodiment, the left auxiliary bag portion 40L and the right auxiliary bag portion 40R have a substantially trapezoidal plate shape as the inflation completed shape with a narrow width over the side of the distal end 40b. Therefore, it is possible to stably push the occupant protective surface (occupant-side wall portion 33) of the main bag portion 32 in a wide range in front-rear and left-right direction during the inflation.

Figure 18:
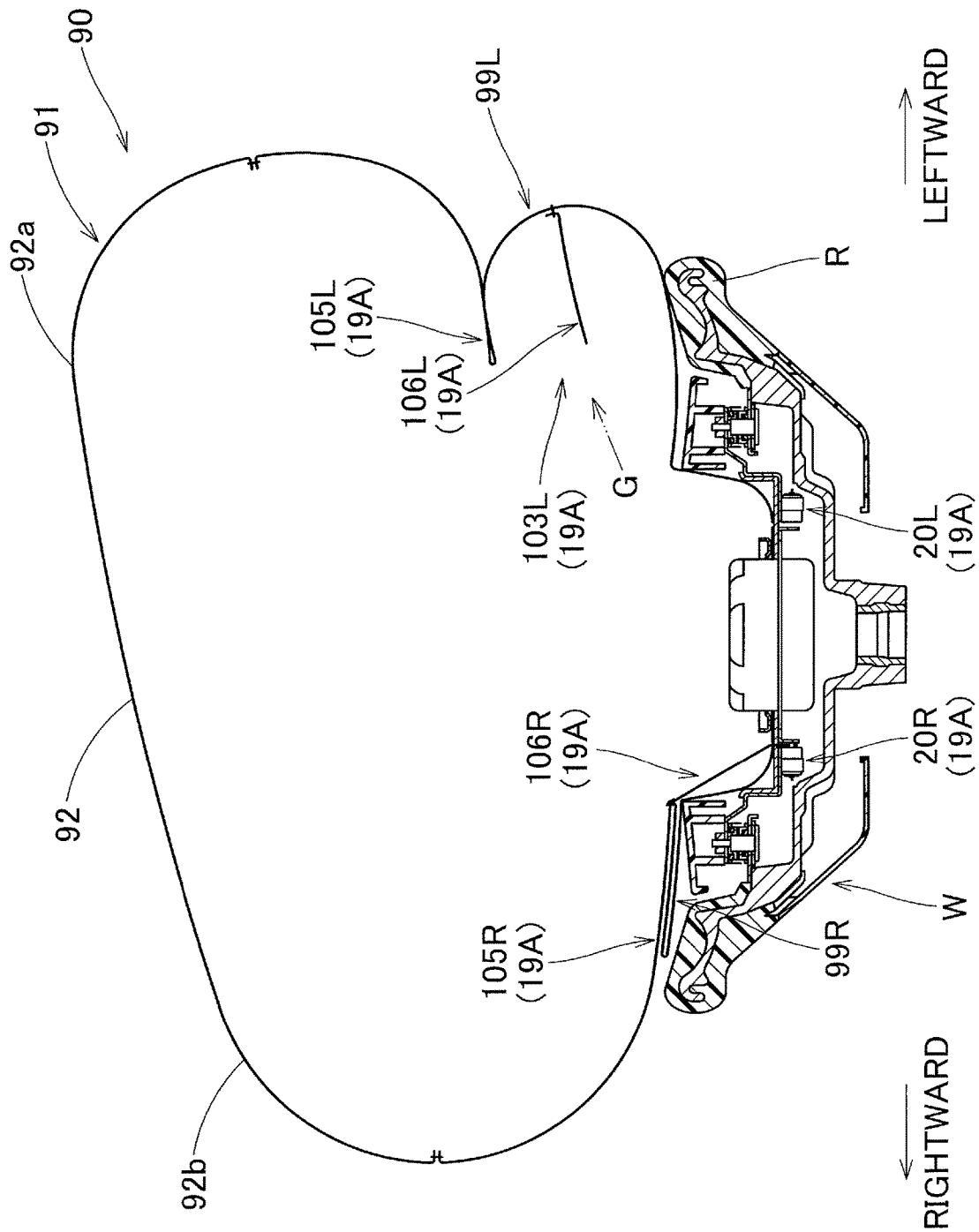
FIG. 18 is a sectional view schematically illustrating a state in which the main bag portion and one auxiliary bag portion are inflated in the driver seat airbag apparatus that uses the airbag in FIG. 14.

Next, an airbag 90 of another embodiment of the invention will be described. As illustrated in FIGS. 17 to 19, the airbag 90 is also used in the driver seat airbag apparatus. Similar to the airbag 30 described above, the airbag 90 also includes a main bag portion 91 that is inflated to cover the steering wheel W when inflation is completed and a left auxiliary bag portion 99L and a right auxiliary bag portion 99R which are disposed on both right and left sides of an inflow opening 94 on a side of a back surface of the main bag portion 91 (on the side of the steering wheel main body 1 that is on the side of the lower surface) (refer to FIGS. 14 and 15).

The main bag portion 91 has the same configuration as that of the main bag portion 32 of the airbag 30 described above and is provided with a vehicle body-side wall portion 93 that is disposed on the side of the steering wheel main body 1 (the side of the ring portion R) when the inflation is completed and an occupant-side wall portion 92 that is disposed on the side of the driver. An inflow opening 94 and four attachment holes 95 are formed at the center of the vehicle body-side wall portion 93. Through-holes 96L and 96R are formed on a side of a left edge and a side of a right edge of the inflow opening 94 of the vehicle body-side wall portion 93 and are parts for causing the sides of distal ends 106a of connection members 106L and 106R to project to the outside. The connection members 106L, 106R are extended from opening-closing portions 105L and 105R that enable inflow port portions 103L and 103R formed in the left auxiliary bag portion 99L and the right auxiliary bag portion 99R to be opened and closed. Also in the main bag portion 91, the occupant-side wall portion 92 is configured to have an occupant protective surface that is disposed to face the driver, who is the occupant, when the inflation is completed.

Since the left auxiliary bag portion 99L and the right auxiliary bag portion 99R are symmetrical from the left side to the right side, the left auxiliary bag portion 99L is exemplified and is described in detail, and the detailed description of the right auxiliary bag portion 99R is omitted.

Figure 14:
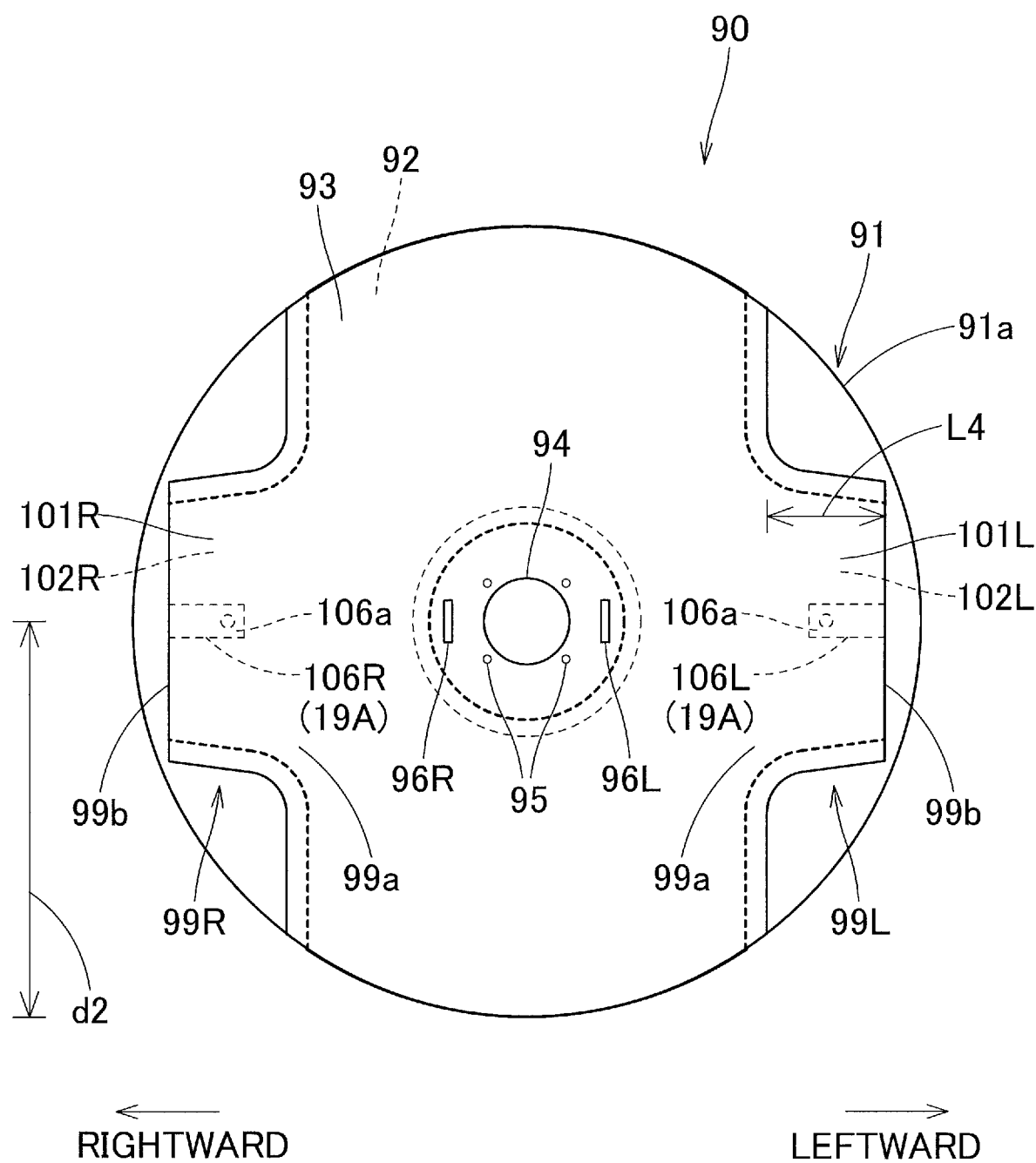
FIG. 14 is a bottom view illustrating a flatly deployed state of an airbag in another embodiment of the invention.

As illustrated in FIGS. 14 and 16A, in a state in which the airbag 90 is flatly deployed, the left auxiliary bag portion 99L is disposed on the left side of the inflow opening 94 toward the left side. The left auxiliary bag portion 99L is configured to have a substantially trapezoidal external shape obtained in the flatly deployed state, with a slightly wider width on a side of a base portion 99a, which is the side of the inflow opening 94, than on a side of a distal end 99b that is disposed on an outward side in the left-right direction. Specifically, the left auxiliary bag portion 99L is configured to join circumferential edges of a vehicle body-side wall portion 101L that is disposed on the side of the steering wheel main body 1 (the side of the ring portion R) when the inflation is completed and a main bag-side wall portion 102L that is disposed on the side of the main bag portion 32 when the inflation is completed. The vehicle body-side wall portion 101L and the main bag-side wall portion 102L have substantially the same trapezoidal external shape. The left auxiliary bag portion 99L has a substantially trapezoidal plate shape as the inflation completed shape that slightly narrows on the side of the distal end 99b. The left auxiliary bag portion 99L is provided with the inflow port portion 103L through which the left auxiliary bag portion communicates with the main bag portion 91 and an inflating gas G having flowed into the main bag portion 91 is flowable into the inside of the left auxiliary bag portion, on the side of the base portion 99a, which is the side of the inflow opening 94. The left auxiliary bag portion 99L causes the vehicle body-side wall portion 101L to be linked from the circumferential edge of the inflow opening 94 when the inflating gas flows into the inside of the left auxiliary bag portion 99L through the inflow port portion 103L and the left auxiliary bag portion 99L is inflated, and thus the left auxiliary bag portion 99L is interposed between the steering wheel main body 1 (specifically, a part of the ring portion R) and the main bag portion 91.

Figure 15:
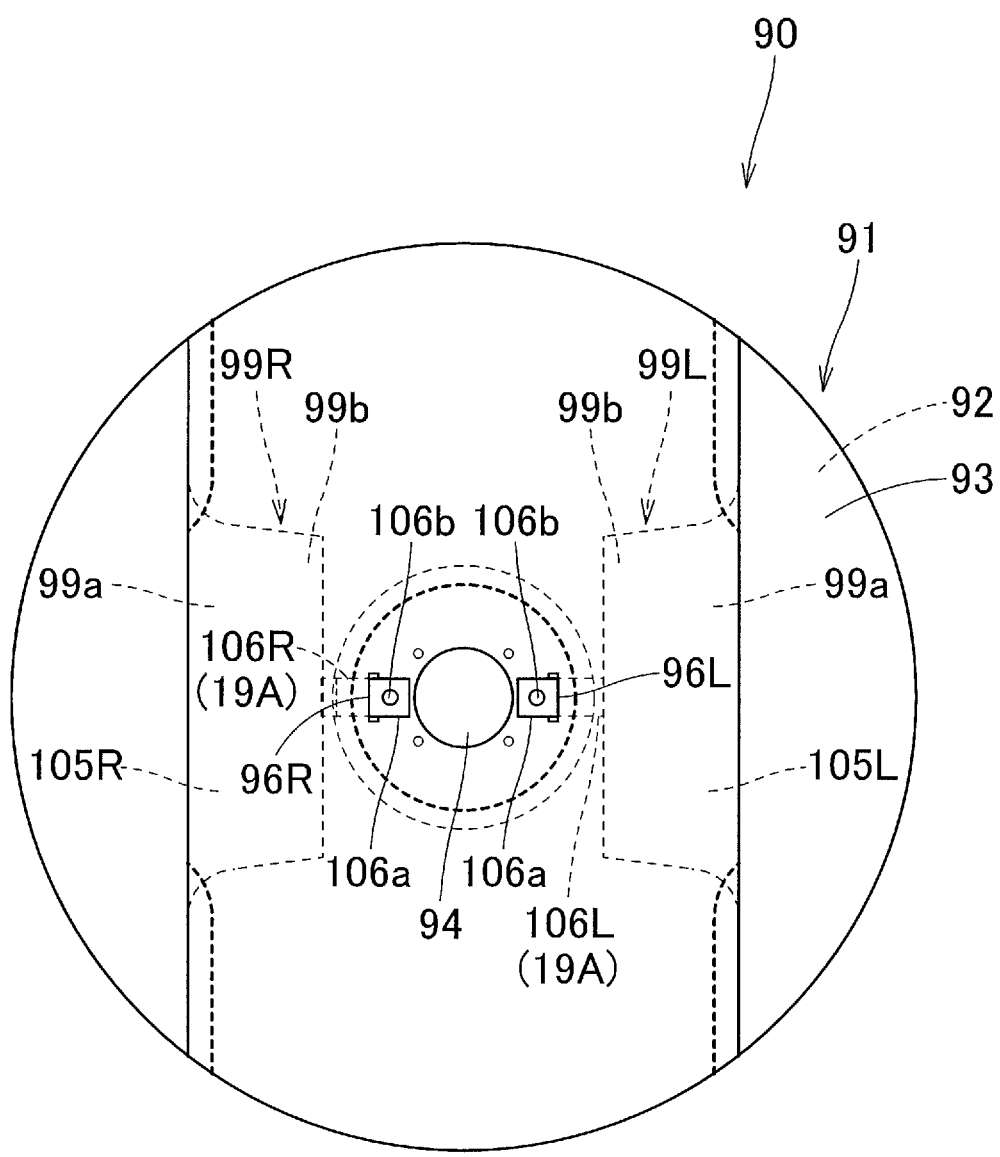
FIG. 15 is a bottom view illustrating a state in which an auxiliary bag portion enters an inside of a main bag portion and a distal end of a connection member projects from a through-hole in the airbag in FIG. 14.

In a flatly deployed state, a width dimension (a length dimension on a side in the left-right direction) L4 from the base portion 99a to the distal end 99b of the left auxiliary bag portion 99L is set about one third of a radius dimension d2 of the main bag portion 91 (refer to FIG. 14), and is set smaller compared to the left auxiliary bag portion 40L of the airbag 30 described above. That is, the left auxiliary bag portion 99L is arranged apart from the inflow opening 94 and to be disposed at a side of an outer circumferential edge 91a of the main bag portion 91. A width dimension of the left auxiliary bag portion 99L in the front-rear direction is set to be substantially the same as that of the left auxiliary bag portion 40L of the airbag 30 described above. The left auxiliary bag portion 99L causes the connection member 106L, which is connected to the actuator 20L, to be disposed at a position in the vicinity of the distal end 99b on a side of an inner circumferential surface. As illustrated in FIGS. 15 and 16B, the left auxiliary bag portion 99L is folded along with the main bag portion 91 and is mounted on the vehicle in a state in which the vehicle body-side wall portion 101L and the main bag-side wall portion 102L overlap each other so as to be flatly deployed and the side of the distal end 106a of the connection member 106L projects from through-hole 96L while the left auxiliary bag portion is inverted to enter the main bag portion 91 in a part of the inflow port portion 103L. The through-hole 106b, into which the actuation pin 22L of the actuator 20L described above can be inserted, is formed on the side of the distal end 106a of the connection member 106L. The length dimension of the connection member 106L is set to a dimension by which it is possible to maintain an inverted state of the left auxiliary bag portion 99L and to maintain a press-contact state between a base portion-side part 101a of the vehicle body-side wall portion 101L that configures the inflow port portion 103L and a base portion-side part 102a of the main bag-side wall portion 102L, when a connection state with the actuator 20L is maintained and the airbag 90 is inflated.

The inflow port portion 103L is configured of a part of the base portion 99a of the left auxiliary bag portion 99L, which communicates with the main bag portion 91. In addition, in the airbag 90 of the embodiment, the base portion-side part 101a of the vehicle body-side wall portion 101L and the base portion-side part 102a of the main bag-side wall portion 102L, which configure a circumferential edge of the inflow port portion 103L, configure the opening-closing portion 105L that enables the inflow port portion 103L to be opened or closed. When a connection state between the connection member 106L and the actuator 20L is maintained and the airbag 90 is inflated, the base portion-side part 101a of the vehicle body-side wall portion 101L and the base portion-side part 102a of the main bag-side wall portion 102L, which configure the opening-closing portion 105L, receive a pressure of the inflating gas that flows into the main bag portion 91 such that a contact state of the base portion-side parts with each other is maintained. In addition, when the airbag 90 is inflated in a state in which the connection between the connection member 106L and the actuator 20L is canceled, the base portion-side parts 102a and 103a are separated from each other and the inflow port portion 103L is opened.

In the airbag apparatus that uses the airbag 90, a control mechanism 19A that controls an inflated shape of the airbag 90 is configured to include the inflow port portions 103L and 103R through which the left auxiliary bag portion 99L, the right auxiliary bag portion 99R, and the main bag portion 91 communicate with each other; the opening-closing portions 105L and 105R that enable the inflow port portions 103L and 103R to be opened or closed; the connection members 106L and 106R that extend from the side of the distal ends 99b of the left auxiliary bag portion 99L and the right auxiliary bag portion 99R; and the actuators 20L and 20R that are connected to the distal ends 106a of the connection members 106L and 106R. In a case where the airbag 90 is completely inflated in a state in which the actuators 20L and 20R are not actuated, the connection members 106L and 106R are maintained in the connection state to the actuators 20L and 20R, and the left auxiliary bag portion 99L and the right auxiliary bag portion 99R are pulled to each other by the connection members 106L and 106R such that the state of entering the inside of the main bag portion 91 is maintained. At this time, the base portion-side parts 101a of the vehicle body-side wall portions 101L and 101R and the base portion-side parts 102a of the main bag-side wall portions 102L and 102R, which configure the opening-closing portions 105L and 105R, receive the pressure of the inflating gas that flows into the main bag portion 91 such that a contact state of the base portion-side parts with each other is maintained, and only the main bag portion 91 is inflated in a state in which the inflating gas does not flow into the inside of the left auxiliary bag portion 99L and the right auxiliary bag portion 99R (refer to FIG. 17). In a case where the airbag 90 is completely inflated in a state in which the actuators 20L and 20R are actuated, the actuation pins 22L and 22R are pulled out from the through-holes 106b of the connection members 106L and 106R during the actuation of the actuators 20L and 20R, and the connection of the connection members 106L and 106R to the side of the case 11 is canceled. Therefore, the base portion-side parts 101a of the vehicle body-side wall portions 101L and 101R and the base portion-side parts 102a of the main bag-side wall portions 102L and 102R, which configure the opening-closing portions 105L and 105R, allow the inflating gas to flow into the inside and are separated from each other such that the inflow port portions 103L and 103R are opened. The inflating gas flows into the inside of the left auxiliary bag portion 99L and the right auxiliary bag portion 99R through the inflow port portions 103L and 103R, the left auxiliary bag portion 99L and the right auxiliary bag portion 99R are inflated such that the inverted state is canceled, and the main bag portion 91, the left auxiliary bag portion 99L, and the right auxiliary bag portion 99R are completely inflated (refer to FIG. 19). To be more specifically described, when the airbag 90 is inflated in a state in which the actuators 20L and 20R are not actuated, the connection members 106L and 106R pull the base portion-side parts 102a of the main bag-side wall portions 102L and 102R which are disposed on the upper side in the opening-closing portions 105L and 105R such that floating of the base portion-side part 102a is suppressed, and thereby it is possible to accurately maintain the closing state of the opening-closing portions 105L and 105R (a press-contact state of the base portion-side parts 101a and 102a of the vehicle body-side wall portions 101L and 101R and the main bag-side wall portions 102L and 102R with each other).

Even in the airbag apparatus that uses the airbag 90, the left auxiliary bag portion 99L and the right auxiliary bag portion 99R of the airbag 90 are interposed between the main bag portion 91 and the ring portion R of the steering wheel W as the vehicle body-side member so as to push the occupant protective surface (occupant-side wall portion 92) of the main bag portion 91 toward the side of the driver when the inflation is completed. In the airbag 90, although the left auxiliary bag portion 99L and the right auxiliary bag portion 99R are configured to have a smaller volume than that of the left auxiliary bag portion 40L and the right auxiliary bag portion 40R of the airbag 30 described above, the left auxiliary bag portion 99L and the right auxiliary bag portion 99R are arranged apart from the inflow opening 94 and be disposed at positions on the outer circumferential edge 91a of the main bag portion 91. Therefore, as illustrated in FIG. 18, when the left auxiliary bag portion 99L disposed on the side in the collision direction is inflated during the oblique collision, the offset collision, or the like of the vehicle, the left auxiliary bag portion 99L which is inflated in the vicinity of the outer circumferential edge 91a of the main bag portion 91 causes a left region 92a as a region (region on the side of the left auxiliary bag portion 99L) on the side in the collision direction, which is one side in the left-right direction, to be pushed to the side of the driver and causes the occupant-side wall portion 92 to be obliquely disposed with respect to the rightward-leftward direction. At this time, similar to the airbag 30 described above, although not illustrated, the occupant-side wall portion 92 (occupant protective surface) is disposed to be substantially orthogonal to a movement direction of the head of the driver. Therefore, it is possible to smoothly receive the head of the driver, which moves obliquely forward, by the occupant-side wall portion 92 (occupant protective surface) of which generation of unevenness is suppressed and which is widely deployed to face the head of the driver which moves obliquely. In addition, when the left auxiliary bag portion 99L and the right auxiliary bag portion 99R are not inflated, as illustrated in FIG. 17, the main bag portion 91 is inflated such that the occupant-side wall portion 92 (occupant protective surface) faces the driver who does not move obliquely but moves forward (such that the occupant-side wall portion is substantially parallel to the ring surface Ra), and it is possible to smoothly receive the head of the driver by the occupant-side wall portion 92 (occupant protective surface) that is widely deployed even when the left auxiliary bag portion 99L and the right auxiliary bag portion 99R are not inflated. In addition, in a case where the left auxiliary bag portion 99L is not inflated and only the right auxiliary bag portion 99R is inflated, as illustrated by a two-dot chain line in FIG. 19, the right region 92b of the occupant-side wall portion 92 is pushed to the side of the driver and is obliquely disposed with respect to the left-right direction (the ring surface Ra).

In addition, also in the airbag 90, since the left auxiliary bag portion 99L and the right auxiliary bag portion 99R are configured to be provided at two positions on both right and left sides of the case 11, it is possible to change the inflation completed shape of the airbag 90 into more various shapes depending on the collision mode, a physical constitution of the occupant who is protected, or the like. Specifically, similar to the airbag 30 described above, in a case where it is possible to inflate both of the left auxiliary bag portion 99L and the right auxiliary bag portion 99R (refer to FIG. 19), and when both of the left auxiliary bag portion 99L and the right auxiliary bag portion 99R are inflated, the entire occupant protective surface (occupant-side wall portion 92) can be disposed to be pushed to the side of the driver while maintaining the state of facing the driver, compared to a case where the left auxiliary bag portion 99L and the right auxiliary bag portion 99R are not inflated.

In the airbags 30 and 90 of the embodiments, the opening-closing portions 48L, 48R, 105L, and 105R are configured to be opened when the actuators 20L and 20R are actuated, that is, when the connection state of the connection members 65UL, 65DL, 65UR, 65DR, 106L, and 106R to the actuators 20L and 20R is canceled. However, the opening-closing portion may be configured to be opened when the connection state to the actuator is maintained and the closing state can be maintained when the connection to the actuator is canceled. Specifically, the connection member is connected to a valve seat as the opening-closing portion that is joined to the circumferential edge of an opening so as to close the opening, and the valve seat is removed from a circumferential edge portion of the opening which moves in association with the inflation of the airbag such that the opening is opened during the maintaining of the connection. On the other hand, when the connection is canceled, a configuration in which a joining state of the valve seat to the circumferential edge of the opening is maintained such that the opening is in the closing state may be exemplified.

In addition, in the embodiment, the driver seat airbag apparatus that is mounted on the steering wheel is exemplified and is described in detail; however, the airbag apparatus, to which the invention is applicable, is not limited to the driver seat airbag apparatus. The invention may have a configuration in which the auxiliary bag portion is inflated between the main bag portion and an installment panel as the vehicle body-side member and may also be applied to a passenger seat airbag apparatus that is disposed in front of a passenger seat.

What is claimed is:

1. An airbag apparatus comprising:
 a flexible bag-shaped airbag that is able to protect an occupant sitting on a seat of a vehicle and is folded and stored in a storage part on a vehicle body side;
 an inflator that supplies an inflating gas to the airbag; and
 a control mechanism that controls an inflation shape of the airbag,
 wherein the airbag has
   a main bag portion that is provided with an occupant protective surface which is disposed to face the occupant when inflation is completed, and
   an auxiliary bag portion that can be disposed at least on one side of a left side or a right side of the storage part, between the main bag portion and a vehicle body-side member which configures a periphery of the storage part, when the inflation is completed, and
 wherein the auxiliary bag portion is configured to enable an inflating gas to flow into an inside thereof through the main bag portion, is configured to be inflated under control of the control mechanism in association with a collision mode of the vehicle, and is configured to be interposed between the main bag portion and the vehicle body-side member and to be capable of pushing a region of the occupant protective surface on a side of the auxiliary bag portion, which is inflated, toward a side of the occupant, when the inflation is completed.

2. The airbag apparatus according to claim 1,
 wherein the auxiliary bag portion is provided at each of two positions on both right and left sides of the storage part.

3. The airbag apparatus according to claim 2,
 wherein the control mechanism includes
 an inflow port portion through which the auxiliary bag portion communicates with the main bag portion and the inflating gas having flowed into the main bag portion is flowable into the auxiliary bag portion,
 an opening-closing portion that enables the inflow port portion to be opened or closed,
 a connection member that extends from the opening-closing portion, and
 an actuator that is disposed on a side of the storage part, is configured to be connected to a distal end of the connection member that extends from the opening-closing portion, and is capable of canceling the connection of the distal end of the connection member in association with a collision mode, and
 wherein the opening-closing portion is configured to maintain a closing state during maintaining or canceling a connection state of the distal end of the connection member to the actuator, to be opened during canceling the connection state of the distal end of the connection member to the actuator, and to enable the inflating gas to flow into the inside of the auxiliary bag portion through the inflow port portion.

4. The airbag apparatus according to claim 3,
 wherein the opening-closing portion is configured to maintain a closing state during maintaining the distal end of the connection member to the actuator, to be opened during canceling the connection state of the distal end of the connection member to the actuator, and to enable the inflating gas to flow into the inside of the auxiliary bag portion through the inflow port portion.

5. The airbag apparatus according to claim 4,
 wherein the airbag apparatus is an airbag apparatus for a driver seat, which is mounted on a steering wheel,
 wherein the main bag portion has a substantially circular shape as an external inflation completed shape viewed from above so as to be able to cover an entire surface of a ring portion of the steering wheel on an upper surface side, and
 wherein each auxiliary bag portion is formed to extend from an inflow opening outward in a left-right direction, in a state in which the airbag is flatly deployed, and has a substantially trapezoidal plate shape as the inflation completed shape, having a wider width on a side of a base portion, which is a side of the inflow opening, than on the side of the distal end, which is an outward side in the left-right direction.

6. The airbag apparatus according to claim 5,
 wherein each opening-closing portion has a partition portion that forms a partition into the auxiliary bag portion and the main bag portion in a region of the inflow port portion and a cylindrical portion that is formed to project from the partition portion to the side of the auxiliary bag portion and causes a side of a distal end to be opened, and wherein each connection member is formed to extend from the side of the distal end of the cylindrical portion.

7. The airbag apparatus according to claim 5, wherein each auxiliary bag portion is configured to dispose the connection member at a position in the vicinity of the distal end on a side of an inner circumferential surface, to have a region on the side of the base portion, which communicates with the main bag portion, as the inflow port portion, and to be folded together with the main bag portion in a state in which each auxiliary bag portion is inverted so as to enter the main bag portion in a part of the inflow port portion when being mounted on a vehicle.

8. The airbag apparatus according to claim 1, wherein the control mechanism includes an inflow port portion through which the auxiliary bag portion communicates with the main bag portion and the inflating gas having flowed into the main bag portion is flowable into the auxiliary bag portion, an opening-closing portion that enables the inflow port portion to be opened or closed, a connection member that extends from the opening-closing portion, and an actuator that is configured to be disposed on a side of the storage part and to be connected to a distal end of the connection member that extends from the opening-closing portion and is capable of canceling connection of the distal end of the connection member in association with a collision mode, and wherein the opening-closing portion is configured to maintain a closing state during maintaining or canceling a connection state of the distal end of the connection member to the actuator, to be opened during canceling the connection state of the distal end of the connection member to the actuator, and to enable the inflating gas to flow into the inside of the auxiliary bag portion through the inflow port portion.

* * * * *